United States Patent
Ramos-Martinez et al.

(10) Patent No.: US 11,428,834 B2
(45) Date of Patent: Aug. 30, 2022

(54) PROCESSES AND SYSTEMS FOR GENERATING A HIGH-RESOLUTION VELOCITY MODEL OF A SUBTERRANEAN FORMATION USING ITERATIVE FULL-WAVEFORM INVERSION

(71) Applicant: PGS Geophysical AS, Oslo (NO)

(72) Inventors: Jaime Ramos-Martinez, Katy, TX (US); Alejandro A. Valenciano Mavilio, Bellaire, TX (US); Nizar Chemingui, Houston, TX (US)

(73) Assignee: PGS Geophysical AS, Oslo (NO)

( * ) Notice: Subject to any disclaimer, the term of this patent is extended or adjusted under 35 U.S.C. 154(b) by 929 days.

(21) Appl. No.: 16/221,128

(22) Filed: Dec. 14, 2018

(65) Prior Publication Data
US 2019/0187312 A1    Jun. 20, 2019

Related U.S. Application Data

(60) Provisional application No. 62/599,425, filed on Dec. 15, 2017.

(51) Int. Cl.
*G01V 1/28*    (2006.01)
*G01V 1/30*    (2006.01)
(Continued)

(52) U.S. Cl.
CPC .............. *G01V 1/282* (2013.01); *G01V 1/201* (2013.01); *G01V 1/303* (2013.01); *G01V 1/3808* (2013.01);
(Continued)

(58) Field of Classification Search
CPC .. G01V 1/282; G01V 1/303; G01V 2210/671; G01V 2210/675; G01V 2210/74
See application file for complete search history.

(56) References Cited

U.S. PATENT DOCUMENTS

| 2012/0014214 A1* | 1/2012 | Artman | G01V 1/282 367/25 |
| 2016/0061977 A1* | 3/2016 | Turnbull | G01V 1/36 702/17 |

(Continued)

OTHER PUBLICATIONS

Tarantola, Albert, "Inversion of seismic reflection data in the acoustic approximation," Geophysics, vol. 49, No. 8, Aug. 1984, pp. 1259-1266.

(Continued)

*Primary Examiner* — Mischita L Henson

(57) ABSTRACT

This disclosure describes processes and systems for generating a high-resolution velocity model of a subterranean formation from recorded seismic data gathers obtained in a marine seismic survey of the subterranean formation. A velocity model is computed by iterative FWI using reflections, resolving the velocity field of deep subterranean targets without requiring ultralong offsets. The processes and systems use of an impedance sensitivity kernel to characterize reflections in a modeled wavefield, and then use the reflections to compute a velocity sensitivity kernel that is used to produce low-wavenumber updates to the velocity model. The iterative process is applied in a cascade such that position of reflectors and background velocity are simultaneously updated. Once the low-wavenumber components of the velocity model are updated, the velocity model is used as an input of conventional FWI to introduce missing velocity components (i.e., high-wavenumber) to increase the resolution of the velocity model.

25 Claims, 12 Drawing Sheets

(51) Int. Cl.
*G01V 1/38* (2006.01)
*G01V 1/20* (2006.01)

(52) U.S. Cl.
CPC ........ *G01V 1/3843* (2013.01); *G01V 2210/51* (2013.01); *G01V 2210/671* (2013.01); *G01V 2210/675* (2013.01); *G01V 2210/74* (2013.01)

(56) References Cited

U.S. PATENT DOCUMENTS

| | | | | |
|---|---|---|---|---|
| 2016/0146961 | A1* | 5/2016 | Ratcliffe | G01V 1/282 703/2 |
| 2017/0115411 | A1* | 4/2017 | Zhang | G01V 1/282 |
| 2017/0168178 | A1* | 6/2017 | Crawley | G01V 1/282 |
| 2017/0192118 | A1* | 7/2017 | Du | G01V 1/282 |
| 2018/0356548 | A1* | 12/2018 | Liu | G01V 1/282 |
| 2019/0187312 | A1* | 6/2019 | Ramox-Martinez | G01V 1/3843 |
| 2021/0103065 | A1* | 4/2021 | Whitmore, Jr. | G01V 1/282 |
| 2021/0302607 | A1* | 9/2021 | Hu | G01V 1/282 |

OTHER PUBLICATIONS

Whitmore, N.D., et al., "Applications of RTM Inverse Scattering Imaging Conditions," 2012.

Root, Tim J.P.M. Op't, et al., "Linearized inverse scattering based on seismic reverse time migration," J. Math. Pures Appl. 98, 2012, pp. 211-238.

Zhou, Wei, et al., "Full waveform inversion of diving & reflected waves for velocity model building with impedance inversion based on scale separation," Geophys. J. Int., 2015, vol. 202, pp. 1535-1554.

Wu, Zedong, et al., "Simultaneous inversion of the background velocity and the perturbation in full-waveform inversion," Geophysics, vol. 80, No. 6, Nov.-Dec. 2015, pp. 317-329.

Ramos-Martinez, Jaime, et al., "A robust FWI gradient for high-resolution velocity model building," SEG International Exposition and 86th Annual Meeting, 2016, pp. 1258-1262.

* cited by examiner

PROCESSES AND SYSTEMS FOR GENERATING A HIGH-RESOLUTION VELOCITY MODEL OF A SUBTERRANEAN FORMATION USING ITERATIVE FULL-WAVEFORM INVERSION

CROSS-REFERENCE TO A RELATED APPLICATION

This application claims the benefit of Provisional Application 62/599,425, filed Dec. 15, 2017, which application is hereby incorporated by reference entirely as if fully set forth herein.

BACKGROUND

Marine seismology companies invest heavily in the development of marine seismic surveying equipment and seismic data processing techniques to obtain accurate, high-resolution seismic images of subterranean formations located beneath a body of water. A seismic image of a subterranean formation is a visual representation of the complex geological structures of the subterranean formation. Seismic images are routinely used to discover petroleum reservoirs and monitor petroleum reservoirs during production. A typical marine seismic survey is carried out with one or more survey vessels that tow one or more seismic sources and numerous streamers through the body of water. The survey vessel contains seismic acquisition equipment, such as navigation control, seismic source control, seismic receiver control, and recording equipment. The seismic source control controls activation of the one or more seismic sources at selected times or locations. A seismic source typically comprises an array of source elements, such as air guns, that are activated to produce an acoustic impulse. The acoustic impulse is a sound wave that spreads out in all directions. A portion of the impulse that travels down through the water and into a subterranean formation propagates as a sound wave within the subterranean formation. At each interface between different types of rock and sediment, also called a "reflector," a portion of the sound wave is transmitted and a portion is reflected upward to propagate toward the water surface. When the sound wave experiences a strong velocity contrast between two layers, another portion of the sound wave travels along the interface between the layers and may be refracted upwards to the water surface. A sound wave that travels along an interface is called a "head wave." When the sound wave experiences a gradual increase in velocity with depth (i.e., vertical velocity gradient), at a certain point, a portion of the sound wave turns back to the water surface. A sound wave that turns back to the water surface as a result of increasing velocity with depth is called a "diving wave." The streamers are elongated cable-like structures towed behind a survey vessel in the direction the survey vessel is traveling and are typically arranged substantially parallel to one another. Each streamer contains seismic receivers or sensors distributed along the streamer. The seismic receivers detect pressure and/or particle motion wavefields of the sound waves reflected into the water from the subterranean formation. The streamers collectively form a seismic data acquisition surface. The pressure and/or particle motion wavefields are recorded as seismic data. Seismic imaging methods are applied to the recorded seismic data to generate seismic images of the subterranean formation.

DETAILED DESCRIPTION

Figure 1A:
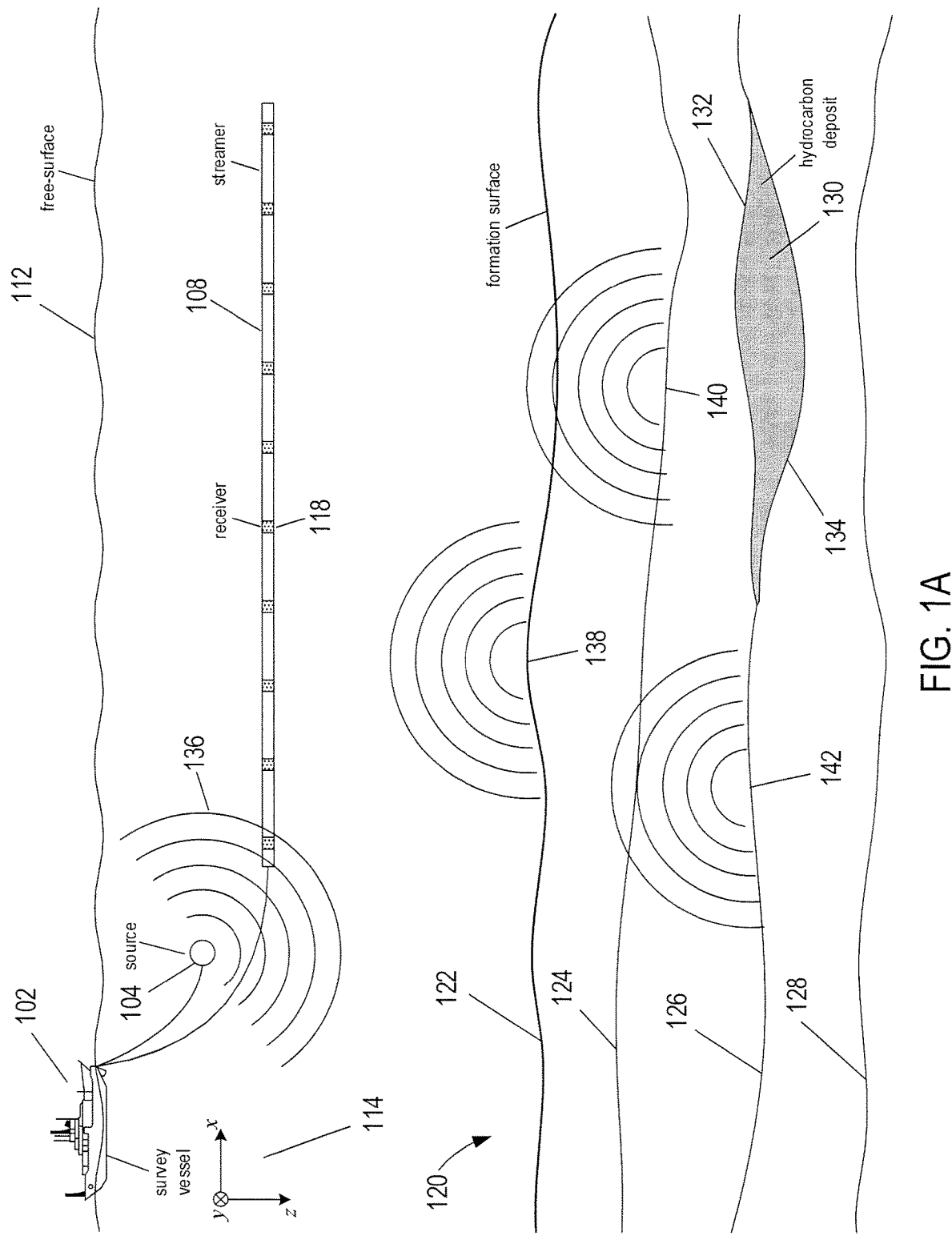
FIGS. 1A-B show side-elevation and top views of an example seismic data acquisition system.

Seismic imaging is executed in two closely connected processing steps: velocity model estimation and migration. Seismic imaging methods employ wave equations that characterize propagation of acoustic waves in a subterranean formation based on velocity and density models of the subterranean formation. A velocity model is a map of the speeds at which acoustic waves propagate within the layers of rock and sediment of the subterranean formation. A density model is a map of the densities of the various layers of rock and sediment of the subterranean formation. Migration focuses the seismic data and produces a seismic image of the subsurface. The velocity model has a two-part role in migration: the velocity model affects focusing of the seismic image; and the velocity model is used to determine locations of imaged reflectors in physical space. The velocity model alone may be used to identify the composition of features and layers within a subterranean formation, such as natural gas accumulations, and may be used for pre-drill prediction of pore pressure, which enables petroleum engineers to take steps that mitigate the risks and hazards associated with drilling into high-pressure petroleum deposits. Because seismic data is only recorded within the body of water above the subterranean formation or at the surface of the subterranean formation, there is typically insufficient information to directly construct the velocity and density models. As a result, various techniques have been developed to create velocity and density models that approximate the wave velocities and densities of the layers within the subterranean formation.

A seismic image of a subterranean formation produced from a velocity model that closely approximates actual wave velocities of acoustic waves traveling in the subterranean formation provides an accurate visual representation of depths and locations of reflectors in the subterranean formation and reveals the complicated configuration of layers within the subterranean formation. This enables more accurate identification of potential petroleum reservoirs, such as oil or natural gas, and more accurate estimates of the volume of petroleum remaining in a petroleum reservoir under production. On the other hand, large deviations in the velocity model from the actual acoustic wave velocities of the layers in the subterranean formation results in seismic images with mislocated reflectors. As a result, depths and configurations of layers visually displayed in the seismic image are inaccurate, which reduces the likelihood of accurately identifying hydrocarbon deposits and decreases reliability of estimates of the amount of petroleum remaining in a hydrocarbon deposit under production.

In recent years, full-waveform inversion ("FWI") has been developed to obtain high-resolution velocity models of the Earth's subsurface. However, conventional FWI techniques have limited use, depending on the depth of water in the marine surveys. For example, conventional FWI has been successfully applied to head and diving waves recorded in shallow water marine surveys to generate high-resolution velocity models with resolved small-scale geological features of subterranean formations in the correct locations. Large-scale velocity variations (i.e., background velocity) are typically resolved for correct placement of small-scale perturbations of velocity. Head and diving waves contain information that may be used to correctly resolve large-scale variations and small-scale perturbations of the velocity models. On the other hand, use of conventional FWI has not been as successful at generating high-resolution velocity models from seismic data recorded in deep water marine surveys with conventional streamers, because the longest source-receiver distances of conventional streamers limit recording of head and diving waves that reach deep within the subterranean formation. Substantially increasing the length of streamers with ultra-long source-receiver distances to obtain high-resolution velocity models using conventional FWI is a costly and impractical solution.

Geophysicists and others working in the petroleum industry have attempted to extend the application of FWI to generate high-resolution velocity models from seismic data collected in deep water marine surveys by incorporating acoustic energy reflections in FWI. Conventional FWI processes use a gradient based on a bulk modulus sensitivity kernel in which high-wavenumber and low-wavenumber components of the velocity model are not separated. Low-wavenumber components correspond to long-wavelengths that may be, for example, on the order of a hundred or hundreds of meters. By contrast, high-wavenumber components correspond to short wavelengths that may be, for example, on the order of tens of meters or smaller. But using acoustic energy reflections in conventional FWI produces updates for high-wavenumber component of the velocity model, while hampering low-wavenumber component updates of the velocity model. As a result, a velocity model generated using conventional FWI is dominated by high-wavenumber components and does not adequately characterize the wavenumber spectrum of the velocity model. Recent efforts to overcome these limitations have been developed by Zhou, W. et al., 2015, "Full-waveform inversion of diving & reflected waves for velocity model building with impedance inversion based on scale separation," *Geophys. J. Int.*, 202, pp. 1535-1554; and Wu, Z. et al., 2015, "Simultaneous inversion of the background velocity and the perturbation in full-waveform inversion," *Geophysics*, 80, pp. R317-R329. The methods of Zhou and Wu use a different approach to that described herein, since both perform Born modeling to split the scale components to carry out inversion.

Processes and systems described herein are directed to generating a high-resolution velocity model of the subterranean formation obtained from iterative reflection-based FWI. Such processes and systems provide advantages over conventional FWI and recent efforts to incorporate reflections into FWI by: (1) creating large-scale deep FWI velocity model updates without having to use longer streamers with ultra-long source-receiver distances; (2) simultaneously correcting reflector positions and updates of background velocity without increasing the computational complexity and time for generating a high-resolution velocity model; (3) using an impedance sensitivity kernel to generate reflections and a velocity sensitivity kernel to produce low-wavenumber component updates to the velocity model; and (4) use optimized dynamic weights that are used to compute an impedance gradient and a velocity gradient that account for velocity and density model complexities and are iteratively constructed. The velocity gradient can be used to suppress high-wavenumber components produced by reflected acoustic energy in the velocity model, such as migration isochrones, while preserving low-wavenumber components of the velocity model. The impedance gradient is used to generate reflections that are in turn used to obtain velocity model updates. As a result, the impedance and velocity gradients enable updates of large-scale perturbations of the velocity model at depths greater than a penetration depth of recorded refracted acoustic energy. Once low-wavenumber component updates to the velocity model have been completed using the iterative FWI process described below, conventional FWI may be applied to the resultant velocity model to introduce high-wavenumber components, producing a final velocity model. Unlike a velocity model generating using conventional FWI, a final velocity model generated by iterative FWI, as described below, is a high-resolution velocity model because the final velocity model contains low-wavenumber components and high-wavenumber components. The final velocity model may be used to determine the compositions of the features and layers of the subterranean formation and to generate images of the subterranean formation with improved resolution.

Figure 1B:
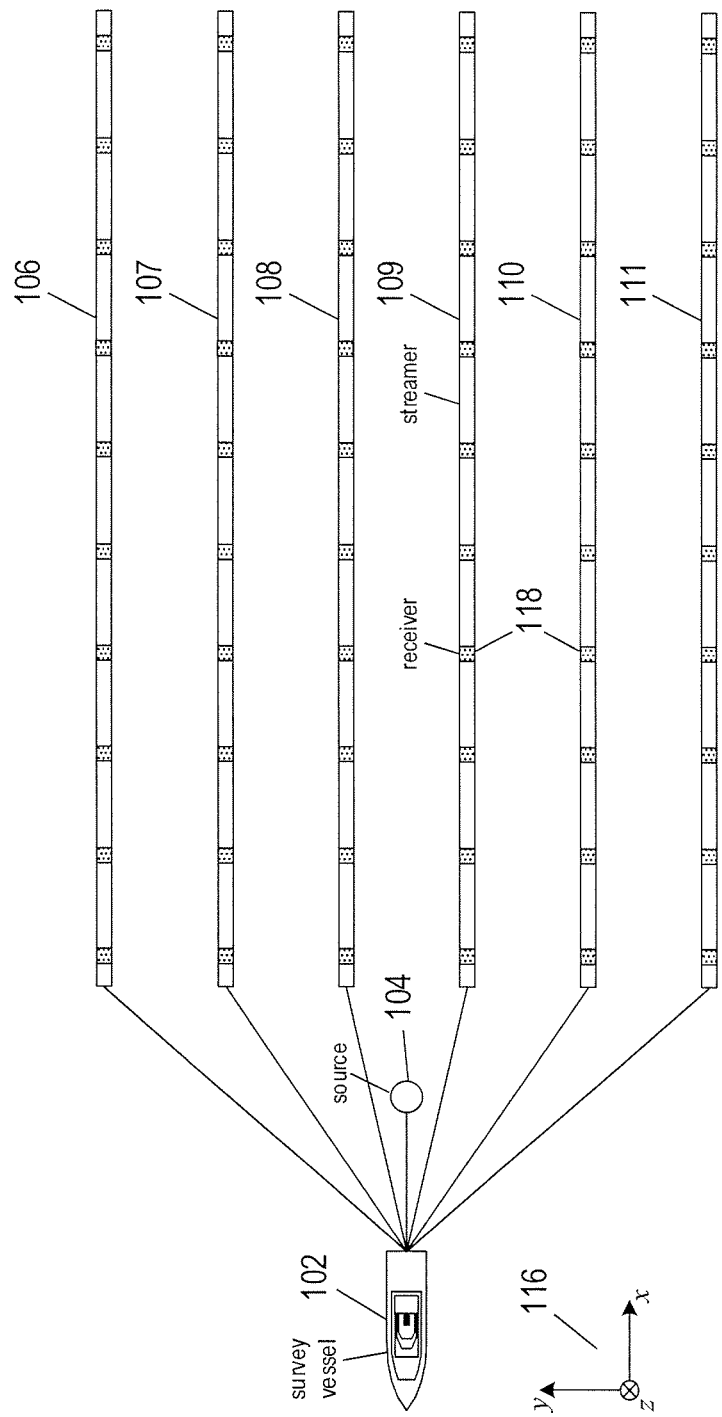

FIGS. 1A-1B show side-elevation and top views, respectively, of an example seismic data acquisition system that includes a survey vessel 102 towing a multiple source array 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form an ideally planar horizontal data acquisition surface with respect to the free surface 112. However, in practice, the data acquisition surface and streamers may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate because of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within a body of water. The x-direction specifies the position of a point in a direction parallel to the length of the streamers or to the direction the survey vessel is traveling and is referred to as the "in-line" direction. The y-direction specifies the position of a point in a direction perpendicular to the x-axis and substantially parallel to the free surface 112 and is referred to as the "cross-line" direction. The z-direction, also referred to as the "depth" direction, specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300-meter intervals in some implementations) along each streamer. In other implementations, buoys may be attached to the streamers and used to maintain the orientation and depth of the streamers below the free surface 112.

FIG. 1A shows the survey vessel 102 towing the source 104 above a subterranean formation 120. Curve 122, the formation surface, represents a top surface of the subterranean formation 120 located at the bottom of the body of water. The subterranean formation 120 may have subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, based on the seismic data collected during a marine seismic survey. As the survey vessel 102 moves over the subterranean formation 120, the source 104 is activated (i.e., fired or shot) to produce an acoustic signal. In other implementations, the source 104 may be towed by one survey vessel and the streamers may be towed by a different survey vessel. FIG. 1A shows an acoustic signal expanding outward from the source 104 as a pressure wavefield 136 represented by semicircles of increasing radius centered at the source 104.

The outwardly expanding wavefronts from the source may be spherical but are shown in vertical plane cross section in FIG. 1A. The outward and downward expanding portion of the pressure wavefield 136 and any portion of the pressure wavefield 136 reflected from the free-surface 112 are called the "source wavefield." The source wavefield eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the acoustic signal primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector or reflection point that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, waves of significant amplitude may be generally reflected from points on or close to the formation surface 122, such as reflection point 138, and from reflection points on or very close to interfaces in the subterranean formation 120, such as reflection points 140 and 142. The upward expanding waves reflected from the subterranean formation 120 are collectively the "reflected wavefield."

The waves that compose the reflected wavefield may be generally reflected at different times within a range of times following the initial source wavefield. A point on the formation surface 122, such as the reflection point 138, may receive a pressure disturbance from the source wavefield more quickly than from a point within the subterranean formation 120, such as reflection points 140 and 142. Similarly, a reflection point on the formation surface 122 directly beneath the source 104 may receive the pressure disturbance sooner than would a more distant-lying reflection point on the formation surface 122. Thus, the times at which waves are reflected from various reflection points within the subterranean formation 120 may be related to the distance, in three-dimensional space, of the reflection points from the activated source 104.

Acoustic and elastic waves may travel at different velocities within different materials as well as within the same material under different pressures. Therefore, the travel times of the source wavefield and reflected wavefield may be functions of distance from the source 104 as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Because the layers of rock and sediment of a subterranean formation are formed from different materials, acoustic waves travel with different wave velocities in different layers of the subterranean formation. An acoustic wave traveling through a subterranean formation has a wave speed denoted by $v(\vec{x})$, where $\vec{x}$ is an observation point with Cartesian coordinates (x,y,z) in a three-dimensional space that includes the medium and the body of water above the subterranean formation. The wave speed represents the speed at which acoustic waves travel within a subterranean formation and is not to be confused with ray velocity of an acoustic wave which refers to a direction along which an acoustic wave travels and the wave speed of the acoustic wave. If the wave speed depends on the observation point $\vec{x}$, the composition of the medium varies from point to point. An observation point may represent a reflection point located along a surface of a subterranean formation or represent a reflection point along an interface between two different types of rock, sediment, or fluid within the subterranean formation. An observation point may also represent a point within a layer of fluid or solid with a homogeneous composition.

Each receiver 118 may be a multi-component sensor including particle motion sensors and a pressure sensor. A pressure sensor detects variations in water pressure over time. The term "particle motion sensor" refers to a sensor that detects any one or more of particle displacement, particle velocity, or particle acceleration over time. Each pressure sensor and particle motion sensor may include or be coupled to an analog-to-digital converter that converts time-dependent analog signals into discrete time series that consist of consecutively measured values called "amplitudes" separated in time by a sample rate. The time series data generated by a pressure or particle motion sensor is called a "trace," which may consist of thousands of samples collected at a typical sample rate of about 1 to 5 samples per millisecond. A trace is a recording of a subterranean formation response to acoustic energy that passes from an activated source and into the subterranean formation where a portion of the acoustic energy is reflected and/or refracted, and ultimately detected by a sensor. In general, each trace is an ordered set of discrete spatial and time-dependent pressure or particle motion sensor amplitudes, and can be denoted by:

$$tr(\vec{x}^s, \vec{x}^r, t) = \{A(\vec{x}^s, \vec{x}^r, t_k)\}_{k=0}^{M-1} \quad (1)$$

where tr represents a trace of pressure, particle displacement, particle velocity, or particle acceleration data;

t represents time;

$\vec{x}^r$ represents the Cartesian coordinates $(x^r, y^r, z^r)$ of a receiver;

$\vec{x}^s$ represents the Cartesian coordinates $(x^s, y^s, z^s)$ of the source 104;

A represents pressure, particle displacement, particle velocity, or particle acceleration amplitude;

$t_k$ is the k-th sample time; and

M is the number of time samples in the trace.

The coordinate location $\vec{x}^r$ of each receiver may be calculated from global position information obtained from one or more global positioning devices located along the streamers, survey vessel, and buoys and the known geometry and arrangement of the streamers and receivers. The coordinate location is of the source 104 may also be obtained from one or more global positioning devices located at each source and the know geometry and arrangement of source elements of the source 104. In the following description, the source coordinates are suppressed. Each trace also includes a trace header not represented in Equation (1) that identifies the specific receiver that generated the trace, receiver and source GPS spatial coordinates, and may include the time sample rate and the number of time samples.

Figure 2:
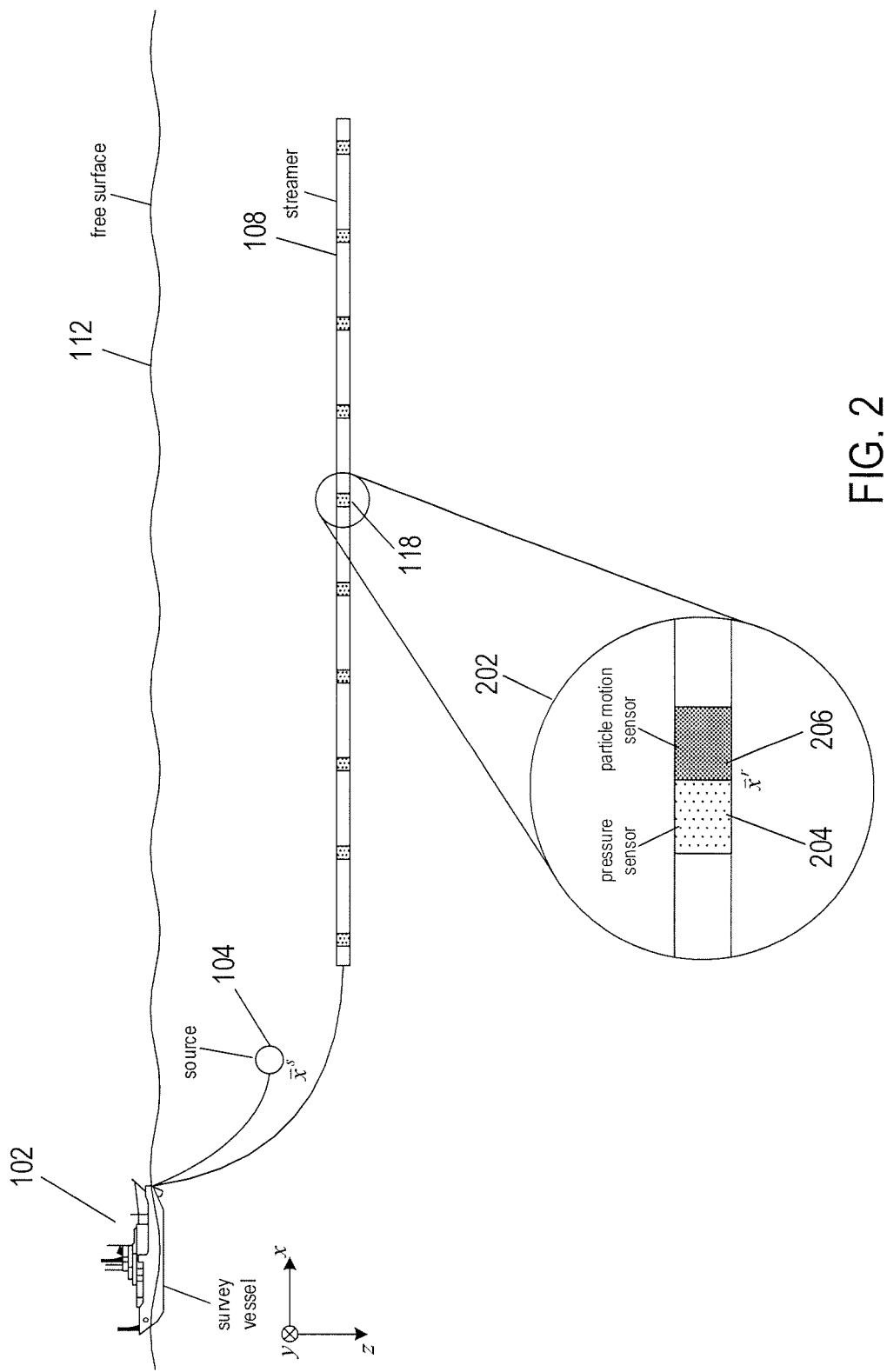
FIG. 2 shows a side-elevation view of a seismic data acquisition system with a magnified view of a receiver.

FIG. 2 shows a side-elevation view of the marine seismic data acquisition system with a magnified view 202 of the receiver 118. In this example, the magnified view 202 reveals that the receiver 118 is a multi-component sensor comprising a pressure sensor 204 and a particle motion sensor 206. The pressure sensor may be, for example, a hydrophone. Each pressure sensor is a non-directional sensor that measures changes in hydrostatic pressure over time to produce a trace of pressure data denoted by $p(\vec{x}^r, t)$. The particle motion sensors may be responsive to water motion. The particle motion sensors are directional sensors that detect particle motion (i.e., displacement, velocity, or acceleration) in a particular direction and may be responsive to such directional displacement of the particles, velocity of the particles, or acceleration of the particles. A particle motion sensor that measures particle displacement produces a trace of particle displacement data denoted by $g_{\vec{n}}(\vec{x}^r, t)$, where the vector $\vec{n}$ represents the direction along which particle displacement is measured. A particle motion sensor that measures particle velocity (i.e., particle velocity sensor) generates a trace of particle velocity data denoted by $v_{\vec{n}}(\vec{x}^r, t)$. A particle motion sensor that measures particle acceleration (i.e., accelerometer) generates a trace of particle acceleration data denoted by $a_{\vec{n}}(\vec{x}^r, t)$. The data generated by one type of particle motion sensor may be converted to another type. For example, particle displacement data may be differentiated to obtain particle velocity data, and particle acceleration data may be integrated to obtain particle velocity data.

The term "particle motion data" refers to particle displacement data, particle velocity data, or particle acceleration data. The term "seismic data" refers to pressure data and/or particle motion data. The pressure data represents a pressure wavefield, particle displacement data represents a particle displacement wavefield, particle velocity data represents a particle velocity wavefield, and particle acceleration data represents particle acceleration wavefield. The particle displacement, velocity, and acceleration wavefields are referred to as particle motion wavefields.

The particle motion sensors are typically oriented so that the particle motion is measured in the vertical direction (i.e., $\vec{n}=(0,0,z)$) in which case $g_z(\vec{x}^r, t)$ is called vertical displacement data, $v_z(\vec{x}^r, t)$ is called vertical velocity data, and $a_z(\vec{x}^r, t)$ is called vertical acceleration data. Alternatively, each receiver 118 may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver 118 may include a pressure sensor and three particle motion sensors that measure particle motion in three orthogonal directions. For example, in addition to having a particle motion sensor that measures particle velocity in the z-direction to give $v_z(\vec{x}^r,t)$, each receiver may include a particle motion sensor that measures the wavefield in the in-line direction in order to obtain the in-line velocity data, $v_x(\vec{x}^r,t)$, and a particle motion sensor that measures the wavefield in the cross-line direction in order to obtain the cross-line velocity data, $v_y(\vec{x}^r,t)$. In certain implementations, the receivers may be only pressure sensors, and in other implementations, the receivers may be only particle motion sensors. The three orthogonal velocity data sets form a velocity vector $\vec{v}=(v_x,v_y,v_z)$.

The streamers 106-111 and the survey vessel 102 may include sensing electronics and data-processing facilities that allow seismic data generated by each receiver to be correlated with the location of the source 104, absolute positions on the free surface 112, and absolute three-dimensional positions with respect to an arbitrary three-dimensional coordinate system. The pressure data and particle motion data may be stored at the receiver, and/or may be sent along the streamers in data transmission cables to the survey vessel 102, where the seismic data may be stored on data-storage devices located onboard the survey vessel 102 and/or transmitted onshore to a seismic data-processing facility.

As explained above, the reflected wavefield typically arrives first at the receivers located closest to the sources. The distance from the sources to a receiver is called the "source-receiver offset," or simply "offset." A larger offset generally results in a longer arrival time delay, for reflections from similar depths due to longer travel paths corresponding to the longer offsets. Traces are sorted according to different source and receiver locations and are collected to form "gathers" that can be further processed using various seismic data processing techniques to obtain information about the structure of the subterranean formation. The traces may be sorted into different domains such as, for example, a common-shot domain, common-receiver domain, common-receiver-station domain, and common-midpoint domain. A collection of traces sorted into the common-shot domain is called a common-shot gather. A collection of traces sorted into common-receiver domain is called a common-receiver gather.

The portion of the acoustic signal reflected into the body of water from the subterranean formation and that travels directly to the receivers is called a primary reflected wavefield or simply a "primary." Other portions of the acoustic signal reflected into the body of water may be reflected many times between the free surface and interfaces within the subterranean formation before reaching the receivers. These multiple reflected wavefields are simply called "multiples." Still other portions of the acoustic signal may create head waves and diving waves within the subterranean formation before being reflected into the body of water. Head waves are created when a portion of the acoustic signal traveling downward through a low-velocity layer reaches a higher velocity layer at the critical angle. Head waves travel in the higher velocity layer parallel to an interface between the layers before being reflected upward toward the formation surface. Diving waves are created when a portion of the acoustic signal travels within a progressively compacted layer, creating a velocity gradient in which velocities increase with depth. Diving waves are continuously refracted along curved ray paths that turn upward toward the surface. The deepest point along the curved ray path is called the "turning point."

Figure 3:
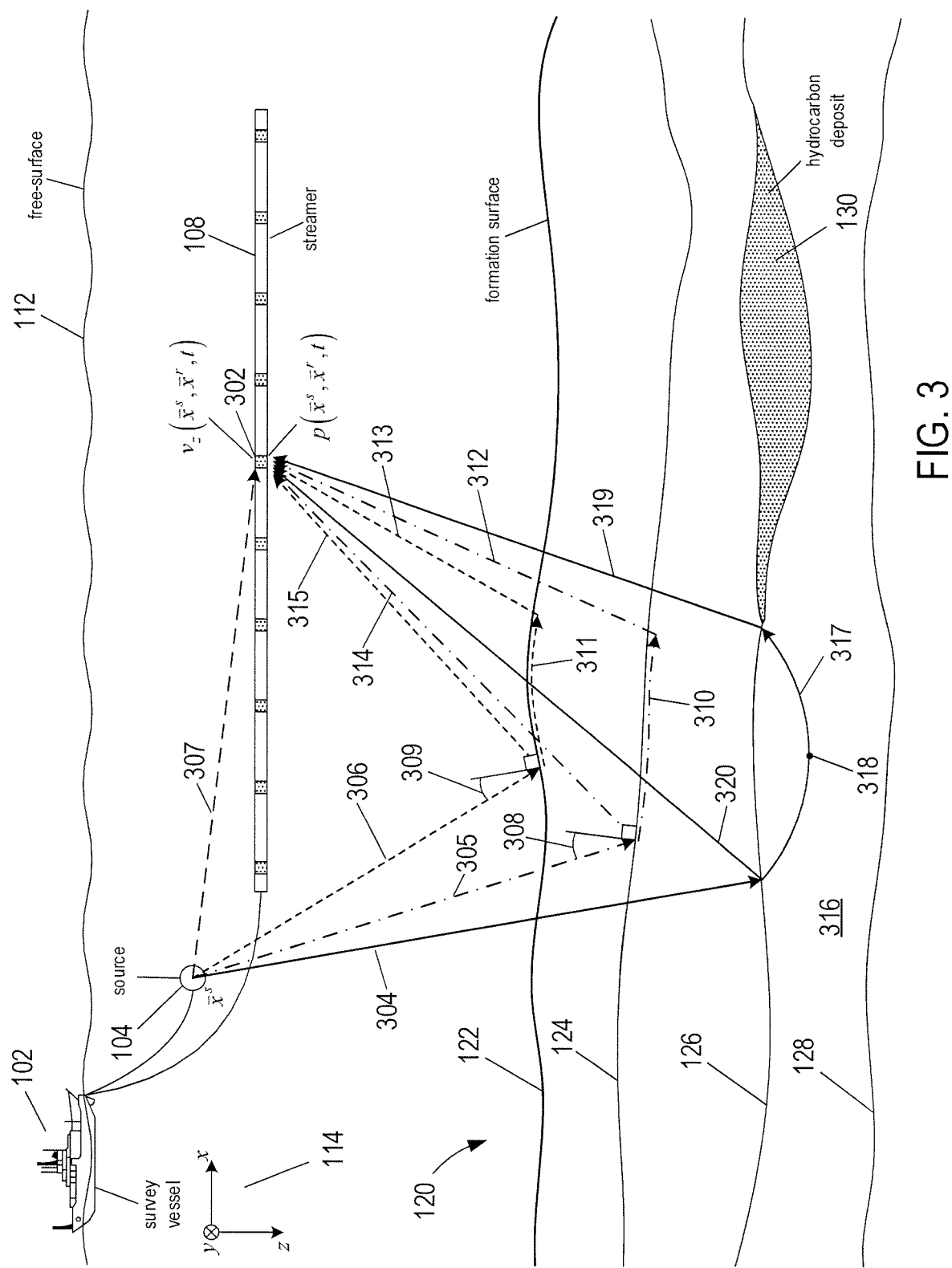
FIG. 3 shows examples of ray paths of reflections of acoustic energy created by an acoustic impulse.

FIG. 3 shows a side elevation view of different example ray paths along which acoustic energy travels between the source 104 and a receiver 302 of the streamer 108. Differently patterned directional arrows 304-307 represent ray paths of different portions of an acoustic signal generated by the source 104. Ray paths 304-306 represent different portions of acoustic energy that interact with the subterranean formation 120. Ray path 307 represents a portion of the acoustic energy that travels directly to the receiver 302. Ray paths 305 and 306 represent paths of acoustic energy that strike the interface 124 and surface 122 at critical angles 308 and 309, respectively, creating head waves that travel along ray paths 310 and 311 adjacent to the interface 124 and surface 122. Ray paths 310 and 311 represent the paths of head waves that travel within the higher velocity layer overlain by a lower velocity layer. Ray paths 312 and 313 represent upward reflections of the acoustic energy of the head waves to the receiver 302. Ray paths 314 and 315 represent different portions of the acoustic energy traveling along ray paths 305 and 306, respectively, that are reflected upward from the interface 124 and the surface 122 to the receiver 302. Ray path 304 reaches the interface 126 of a layer 316 with progressive compaction, creating a vertical velocity gradient in which velocities increase with increasing depth. Curved ray path 317 represents a continuously refracted path of a diving wave that reaches a turning point 318 within the layer 316 and is turned upward to the receiver 302 along ray path 319. Ray path 320 represents a portion of the acoustic energy traveling along ray path 304 that is reflected upward from the interface 126 to the receiver 302. Deeper penetrating acoustic energy (not shown) tends to be reflected back toward the surface 112 but may reach the surface 112 too far away to be recorded by the receivers.

Figure 4:
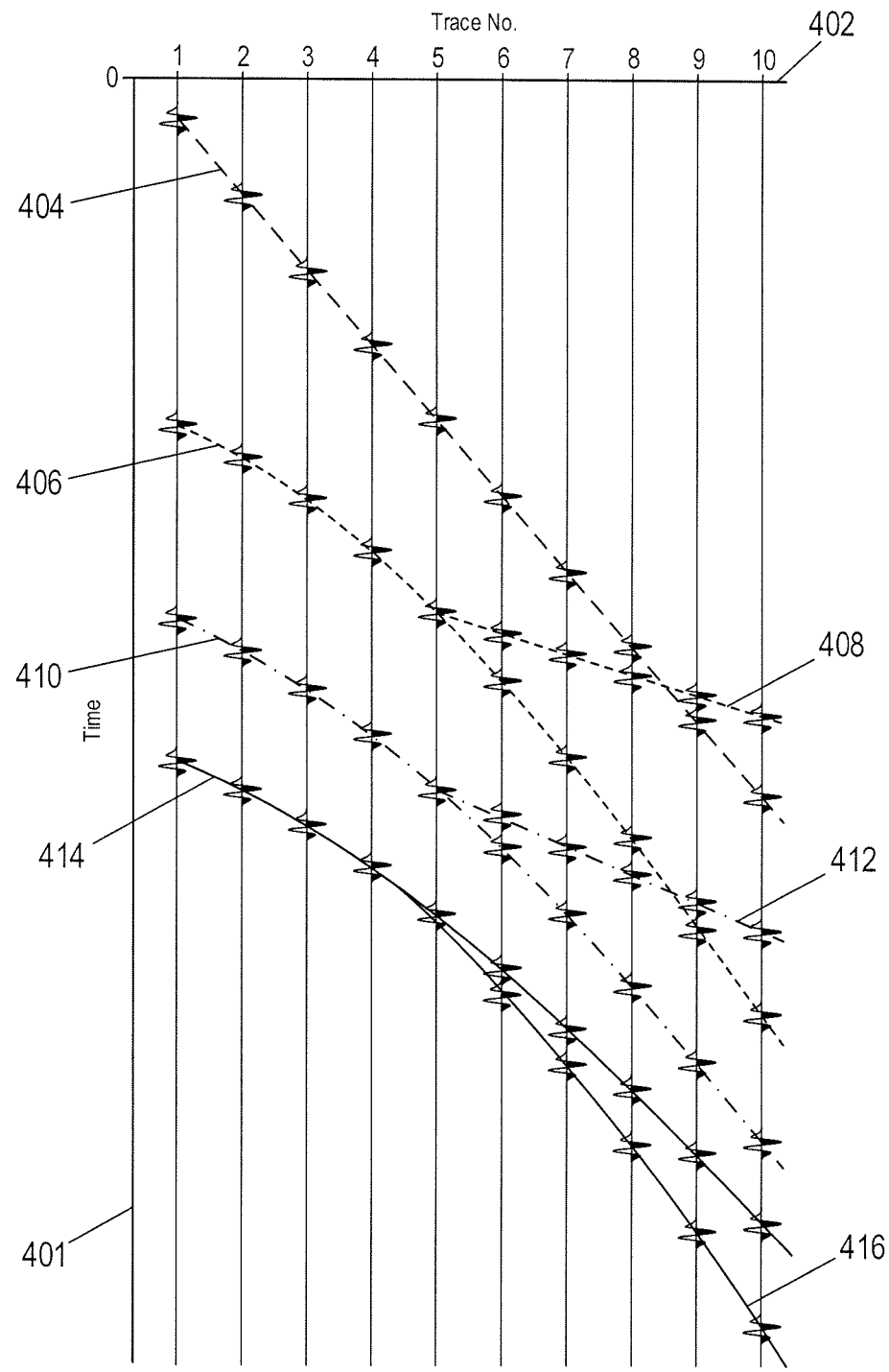
FIG. 4 shows a common-shot gather of wavefields measured by adjacent receivers located along a streamer.

FIG. 4 shows an example common-shot gather 400 of example traces of reflected wavefields measured by the receivers located along the streamer 108 shown in FIG. 3. Vertical axis 401 represents time. Horizontal axis 402 represents channels or trace numbers with trace "1" representing a trace of seismic data generated by a receiver located closest to the source 104 and trace "10" representing a trace of seismic data generated by a receiver located farthest away from source 104. Wavelets represent reflection events from an interface or a surface. The distance along a trace from time zero to the location of a wavelet represents the travel time of the acoustic energy output from the source 104 to an interface or surface and eventually to a receiver located along the streamer 108. Differently patterned lines are added to represent wavefields that correspond to the example events represented by corresponding differently patterned ray paths illustrated in FIG. 3. For example, wavelets located along trace 6 correspond to the reflection events that reach the receiver 302 as represented by differently patterned lines in FIG. 3. Wavelets located along dashed curve 404 represent a portion of the acoustic signal generated by the source 104 that travels directly to the receivers. Wavelets located along dashed curve 406 represent changes in pressure that correspond to acoustic energy reflected upward from the formation surface 122 as represented by ray path 315 in FIG. 3. Wavelets located along dashed line 408 represent changes in pressure created by the head waves that travel just below the surface 122, as represented by ray paths 311 and 313 in FIG. 3. Wavelets located along dot-dashed curve 412 represent changes in pressure that correspond to acoustic energy reflected upward from the interface 124, as represented by ray path 314 in FIG. 3. Dotted-dashed line 412 represents changes in pressure created by the head waves that travel just below the interface 124, as represented by ray paths 310 and 312 in FIG. 3. Wavelets located along curve 414 represent changes in pressure that correspond to acoustic energy reflected upward from the interface 126, as represented by ray path 320 in FIG. 3. Wavelets located along curve 416 represent a diving wavefield created by a portion of the acoustic signal that is turned upward from a vertical velocity gradient of the layer 316 as represented by ray paths 317 and 319 in FIG. 3. For the sake of simplicity of illustration and discussion, the example traces in FIG. 4 only record a small number of the reflected wavefields and do not represent other reflections and various types of noise that are typically recorded during a marine seismic survey, such as shot noise, swell noise, barnacle noise, streamer vibration, and bird noise.

Figure 5:
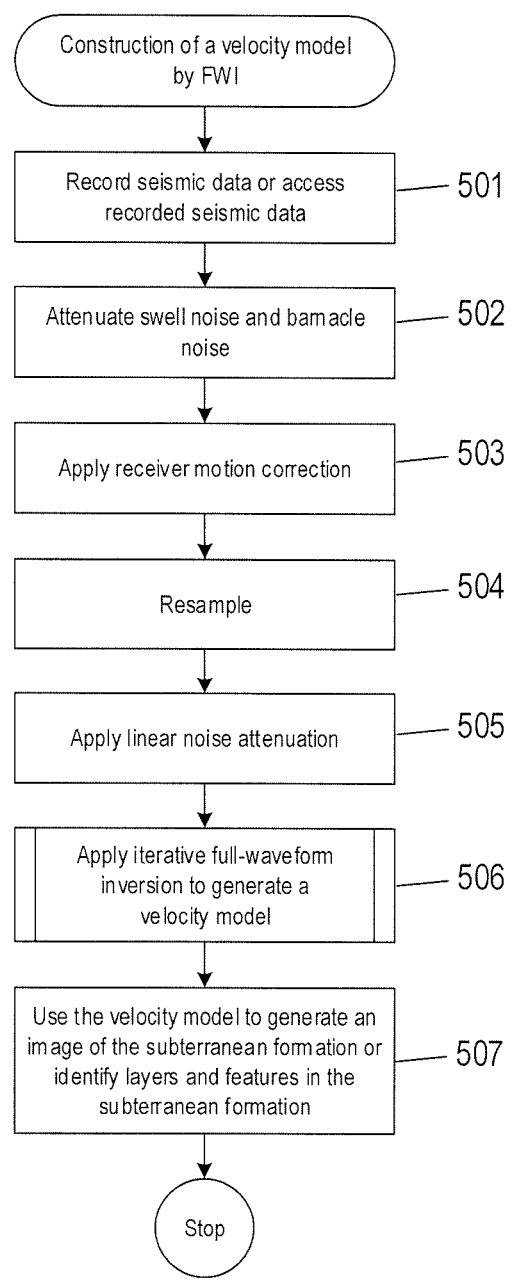
FIG. 5 shows an example process for constructing a velocity model of a subterranean formation from recorded seismic data.

Processes and systems described below are directed to generating a velocity model using iterative FWI. The velocity model may be used in seismic imaging to generate an image of a subterranean formation. The velocity model by itself may be used as an interpretative tool. FIG. 5 shows an example process for constructing a velocity model of a subterranean formation from recorded seismic data collected in a marine seismic survey of the subterranean formation. Each block represents a different module of computer implemented machine-readable instructions stored in one or more data-storage devices and executed using one or more processors of a computer system. The construction of the velocity model may include additional modules or certain modules may be omitted or executed in a different ordering, depending on how the recorded seismic data is collected, conditions under which the recorded seismic data is collected, and depth of the body of water above the subterranean formation.

In FIG. 5, block 501 represents recording seismic data or access previously recorded seismic data as described above with reference to FIGS. 1A-3. The recorded seismic data may be pressure and particle motion data recorded using receivers configured with collocated pressure and particle motion sensors. In block 502, swell noise and barnacle noise in the recorded seismic data is attenuated. In block 503, receiver motion correction is applied to the upgoing and downgoing pressure data to correct for receiver motion as the streamers are towed through the body of water. In block 504, after receiver motion correction, the seismic data is resampled. For example, the traces of pressure wavefield data may be resampled to have the same sampling rate, such as a sample rate of 4 data points per millisecond. In block 505, linear noise in the resampled data is attenuated by, for example, modeling linear noise in the seismic data followed by subtracting the modeled linear noise from the resampled data. In block 506, a procedure "apply iterative full-waveform inversion to generate a velocity model" may be executed to iteratively compute a velocity model of the subterranean formation. The velocity model generated in block 506 contains low-wavenumber components of the acoustic energy reflections from the subterranean formation. In block 507, a conventional FWI method may be applied to the velocity model to introduce high-wavenumber components into the velocity model to create a final velocity model with low-wavenumber and high-wavenumber components of the acoustic energy reflections. In block 508, the final velocity model may be used to identify the composition of layers and features of the subterranean formation or the final velocity model may be used with migration of the seismic data to generate images of the subterranean formation.

Migration may be applied to the seismic data using the final velocity model obtained in block 506 to generate an image of the subterranean formation. The image of the subterranean formation is a visual representation of layers and features of the subterranean formation with improved resolution due to the higher resolution of the final velocity model. For example, depth migration executed using the final velocity model accurately re-locates reflection events in the recorded seismic data to the locations the reflection events occurred within the subterranean formation, thereby resulting in a more accurate visual representation of dips and orientations of interfaces and configuration of layers within the subterranean formation. The image of the subterranean formation may be a two-dimensional visual representation of a cross section of the subterranean formation. The image of the subterranean formation may also be a three-dimensional visual representation of the subterranean formation.

Figure 6:
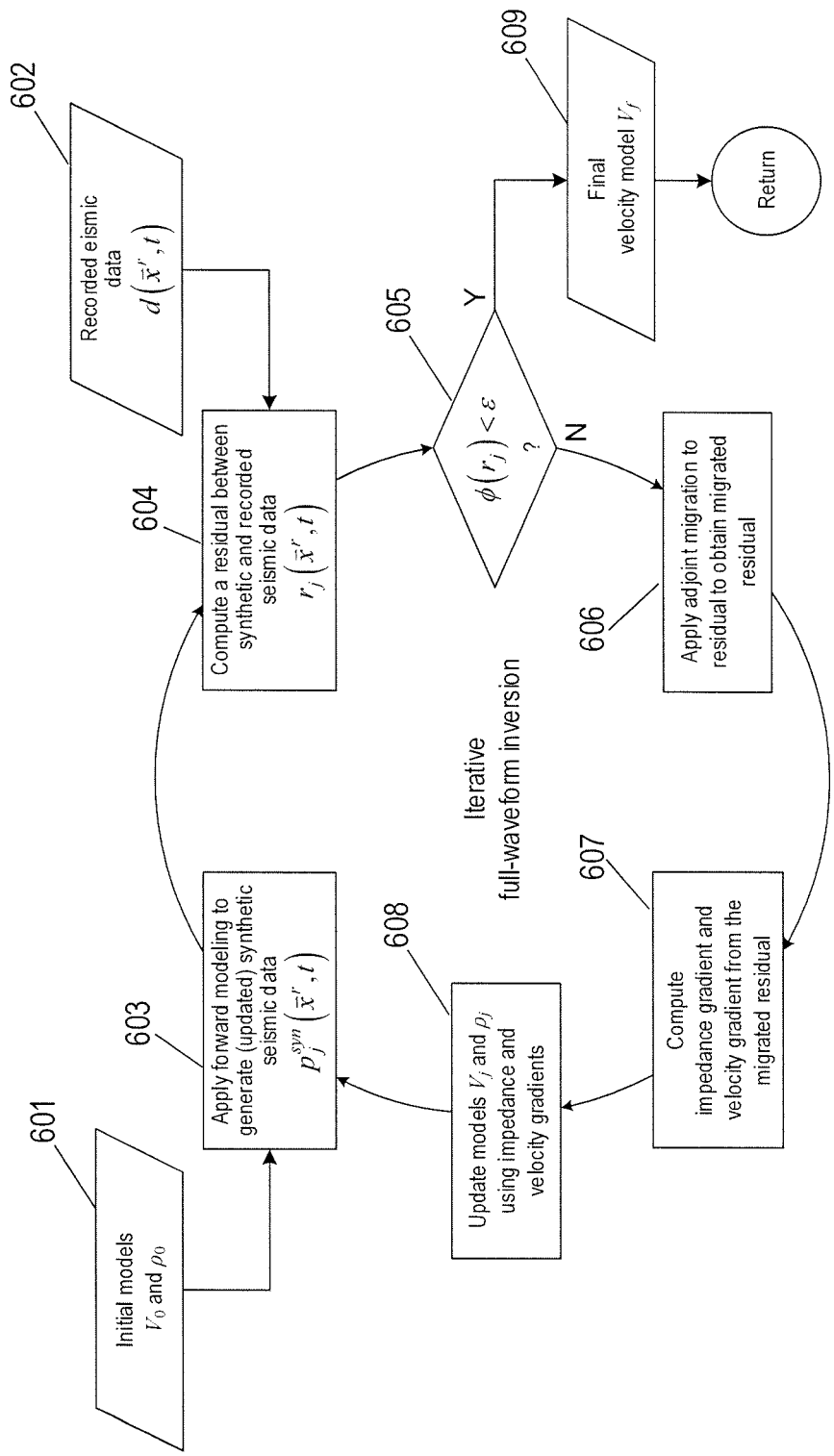
FIG. 6 is a control flow diagram illustrating an example embodiment of the "apply iterative full-waveform inversion to generate a velocity model" procedure referenced in FIG. 5.
Figure 7B:
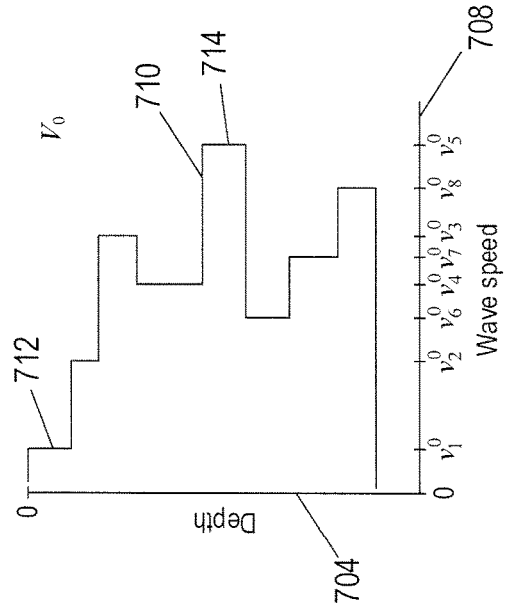
FIG. 7B shows a plot of an example initial velocity model of the synthetic medium shown in FIG. 7A.
Figure 7C:
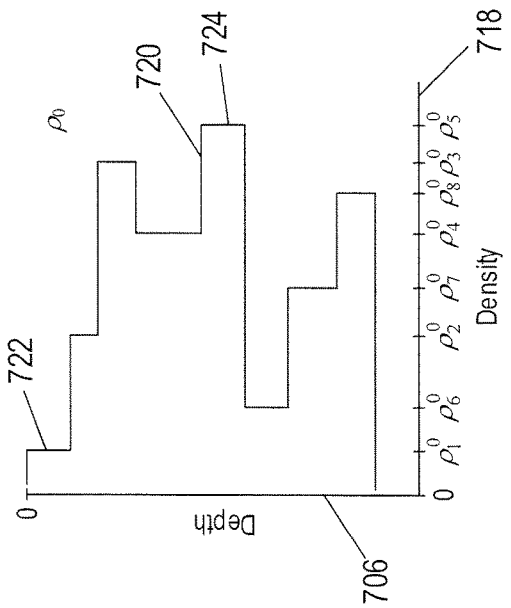
FIG. 7C shows a plot of an example initial density model of the synthetic medium shown in FIG. 7A.
Figure 7A:
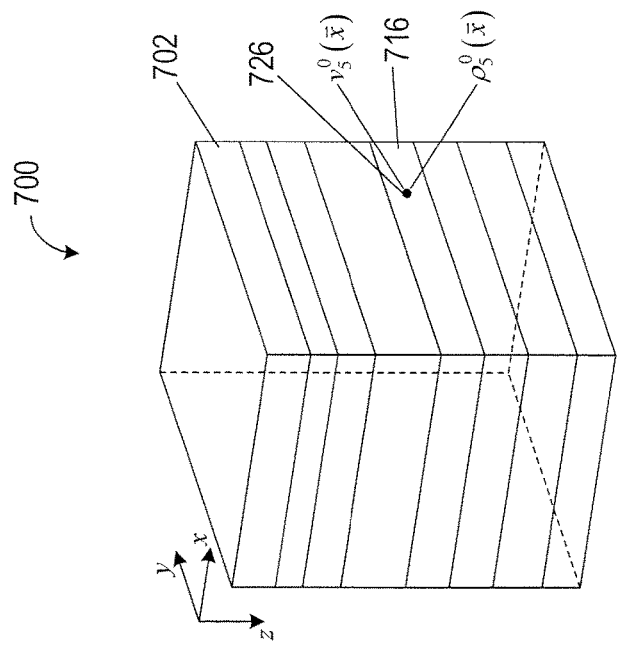
FIG. 7A shows an example of a three-dimensional synthetic medium that represents an initial simple approximation of multiple layers of a subterranean formation investigated using marine seismic techniques.
Figure 8:
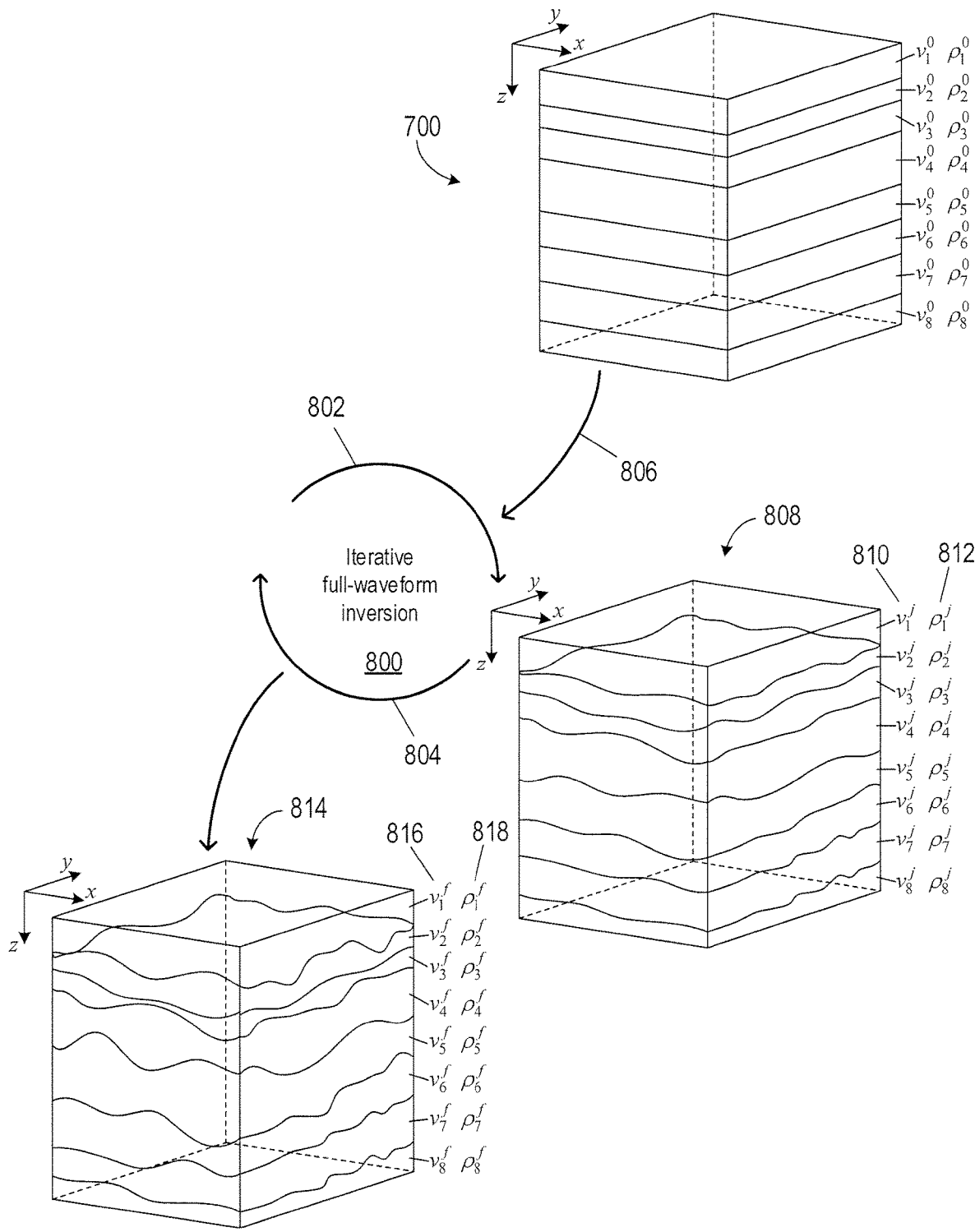
FIG. 8 shows a high-level representation of iterative full-waveform inversion.

FIG. 6 is a control flow diagram illustrating an example embodiment of the "apply iterative full-waveform inversion to generate a velocity model" procedure referenced in block 506 of FIG. 5. FIGS. 7A-7C provide an example illustration of initial velocity and density models introduced in block 601 of FIG. 6. FIG. 8 provides an example illustration at a high level of the iterative FWI process of updating velocity and density models as described below with reference to blocks 603-608 of FIG. 6. FIG. 9 provides an example illustration of final velocity and density models output in block 609 of FIG. 6.

In block 601, an initial velocity model, denoted by $V_0$, and an initial density model, denoted by $\rho_0$, are received as input. The initial velocity model $V_0$ and the initial density model $\rho_0$ may be simple or crude approximations of wave velocities that acoustic waves travel within the subterranean formation and densities of various layers within the subterranean formation.

FIG. 7A shows an example of a three-dimensional synthetic medium 700 that represents an initial simple approximation of multiple layers of a subterranean formation investigated using marine seismic techniques described above. The example synthetic medium 700 comprises eight isotropic layers. Each layer occupies a separate three-dimensional volume within the synthetic medium 700. Initially, each layer has a uniform thickness in the z-direction and represents a homogeneous fluid or solid layer within the synthetic medium 700. Top layer 702 represents a body of water. Layers located below the top water layer 702 represent different layers of rock, sediment, or fluid within the subterranean formation. Each layer of the synthetic medium 700 has an associated wave speed recorded in a velocity model and an associated density recorded in a density model. FIG. 7B shows an example plot of an initial velocity model $V_0$ of the synthetic medium 700. FIG. 7C shows an example plot of an initial density model $\rho_0$ of the synthetic medium 700. The subscript "0" denotes the initial velocity model and the initial density model. In FIGS. 7B and 7C, vertical axes 704 and 706 represent a range of depths below the free surface of a body of water at zero depth. In FIG. 7B, horizontal axis 708 represents a range of wave velocities and jagged curve 710 is the initial velocity model $V_0$ of wave velocities assigned to layers of the synthetic medium 700. Wave velocities of the layers in the synthetic medium 700 are located along the wave speed axis 708 and denoted by $v_q^0$, where superscript "0" identifies the wave velocities of initial velocity model $V_0$ and subscript q=1, . . . , 8 corresponds to the eight layers of the synthetic medium 700. Each vertical segment of the velocity model $V_0$ represents an initial wave speed of a layer within the synthetic medium 700. For example, segment 712 of the velocity model $V_0$ represents the speed of sound in water denoted by $v_1^0$ (i.e., $v_1^0 = c$) and segment 714 of the velocity model $V_0$ represents the wave speed $v_5^0$ of acoustic waves traveling in the layer 716 of the synthetic medium 700. In FIG. 7C, horizontal axis 718 represents a range of densities and jagged curve 720 is the initial velocity model $\rho_0$ of densities assigned to the layers of the synthetic medium 700. Densities of the layers in the synthetic medium 700 are located along density axis 718 and denoted by $\rho_q^0$, where superscript "0" identifies the densities of initial density model $\rho_0$ and subscript q=1, . . . , 8 corresponds to the eight layers of the synthetic medium 700. Each vertical segment of the density model 720 represents an initial density of a layer within the synthetic medium 700. For example, segment 722 of the density model $\rho_0$ represents the density $\rho_1^0$ of the water layer and segment 724 of the density model $\rho_0$ represents the density $\rho_5^0$ of the layer 716 of the synthetic medium 700. Because the layers of the synthetic medium are homogeneous, observation points within the same layer of the synthetic medium 700 have the same wave speed and density. The wave speed and density at an observation point $\vec{x}$ in the q-th layer are denoted by $v_q^0(\vec{x})$ and $\rho_q^0(\vec{x})$, respectively. For example, the wave speed and density at an observation point 726 in the layer 716 are denoted by $v_5^0(\vec{x})$ and $\rho_5^0(\vec{x})$. The synthetic medium 700 is a representative initial model of a subterranean formation, and for ease of illustration, has only eight layers with their corresponding velocity and density values. In practice, a representation of an Earth model of given region, comprises thousands of different values of such properties, because the properties vary in three dimensions.

Returning to FIG. 6, in block 602 recorded seismic data denoted by $d(\vec{x}^r,t)$ is received as input. The recorded seismic data $d(\vec{x}^r,t)$ may be the pressure wavefield $p(\vec{x}^r,t)$, upgoing pressure wavefield $p^{up}(\vec{x}^r,t)$, or downgoing pressure wavefield $p^{dn}(\vec{x}^r,t)$. Iterative FWI is executed by the computational operations represented by blocks 603-608. Iterative FWI in blocks 603-608 iteratively computes a velocity model with low-wavenumber components. Conventional FWI may be applied to the resultant velocity model produced by iterative FWI to introduce high-wavenumber components, creating a high-resolution velocity model with low-wavenumber components and high-wavenumber components. The high-resolution velocity model is the final velocity model denoted by $V_f$ and is output in block 609. The final velocity model $V_f$ may be used to generate a seismic image of the subterranean formation with improved resolution or the final velocity model may be used to identify the composition of features and layers within the subterranean formation, as described above with reference to blocks 507 and 508 in FIG. 5.

FIG. 8 shows a high-level representation of iterative FWI 800 executed by the computational operations of blocks 603-608 of FIG. 6. In the example of FIG. 8, iterative FWI 800 is represented by directional arrows 802 and 804. The initial velocity model $V_0$ and initial density model $\rho_0$ for the synthetic medium 700 are input 806 to the iterative FWI 800. The initial wave velocities and densities of the corresponding layers in the synthetic medium 700 are displayed next to each layer of the synthetic medium 700. Each iteration of the iterative FWI 800 updates the locations of reflectors (i.e., z-coordinate locations of the surface and interfaces) in the synthetic medium and the associated velocity and density models. The velocity and density models generated after each iteration of iterative FWI 800 are denoted by $V_j$ and $\rho_j$, respectively, where j is a non-negative integer used to denote the j-th iteration of iterative FWI 800. FIG. 8 shows an example synthetic medium 808 and associated wave velocities 810 of the j-th velocity model $V_j$ and densities 812 of the j-th density model $\rho_j$ after completion of the j-th iteration. FIG. 8 shows an example final synthetic medium 814 and associated velocities 816 of the final velocity model $V_f$ and densities 818 of the final density model $\rho_f$ after completion of the final iteration of iterative FWI 800. As shown in FIG. 8, iterative FWI 800 changes the configuration of the surface and interfaces of the layers in the synthetic medium 814 to approximate the configuration of the layers in the subterranean formation.

Figure 9B:
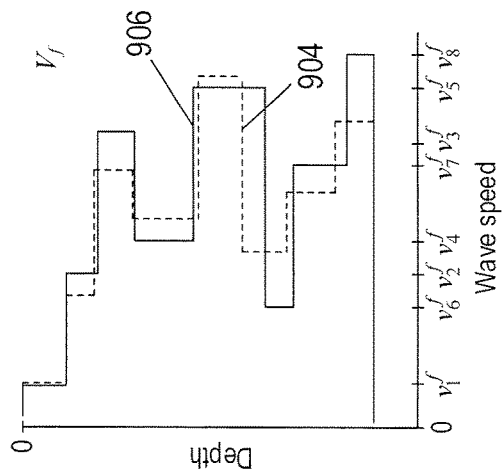
FIG. 9B shows a plot of an example final velocity model of the synthetic medium shown in FIG. 9A.
Figure 9C:
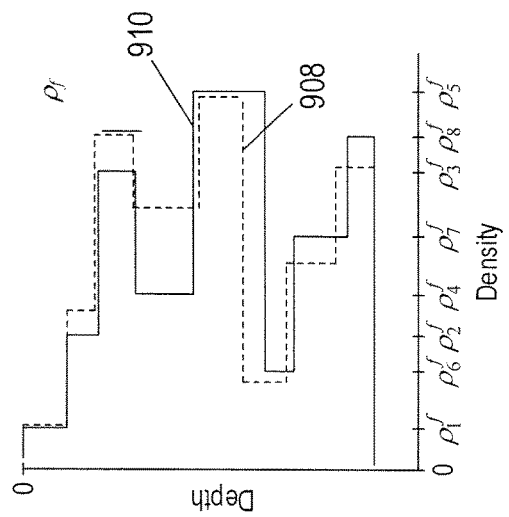
FIG. 9C shows a plot of an example final density model of the synthetic medium shown in FIG. 9A.
Figure 9A:
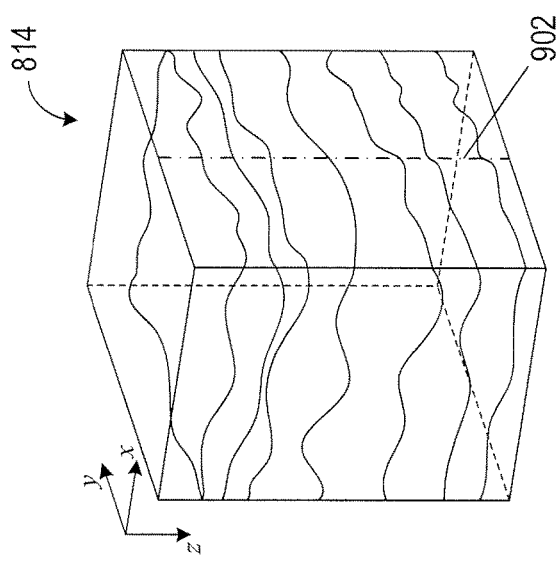
FIG. 9A shows an example of a synthetic medium, generated using iterative full-waveform inversion that approximates a subterranean formation.

FIG. 9A shows the synthetic medium 814 generated in FIG. 8. FIG. 9B shows a plot of an example final velocity model $V_f$ for observation points along dot-dashed line 902 in FIG. 9A. FIG. 9C shows a plot of an example final density model $\rho_f$ for the observation points along the dot-dashed line 902. In FIG. 9B, dashed curve 904 is the initial velocity model $V_0$ represented by curve 710 in FIG. 7B. Curve 906 is the final velocity model $V_f$ obtained from iterative FWI 800 for observation points along the line 902. Comparison of initial velocity model 904 and final velocity model 906 reveals changes in the thickness of each layer for observation points along the dot-dashed line 902 in the synthetic medium 814 and changes in the wave velocities of the layers. In FIG. 9C, dashed curve 908 is the initial density model $\rho_0$ represented by curve 720 in FIG. 7C. Curve 910 represents the final density model $\rho_f$ obtained from iterative FWI 800 for observation points along the line 902. Comparison of initial density model 908 and final density model 910 also reveals changes in the thickness of each layer with observation points along the dot-dashed line 902 in the synthetic medium 814 and changes in the densities of the layers.

Returning to FIG. 6, each iteration of the iterative FWI begins with block 603, in which forward modeling is carried out to compute synthetic seismic data denoted by $p_j^{syn}(\vec{x}^r,t)$ based on the j-the velocity model $V_j$ and the j-th density model $\rho_j$ updated in block 608. In block 603, forward modeling computes synthetic seismic data $p_j^{syn}(\vec{x},t)$ that solves the wave equation:

$$\left[\frac{1}{\rho^j(\vec{x})v^j(\vec{x})^2}\frac{\partial^2}{\partial t^2} - \vec{\nabla}\cdot\left(\frac{1}{\rho^j(\vec{x})}\vec{\nabla}\right)\right]p_j^{syn}(\vec{x},t) = S_j(\vec{x},t) \quad (2)$$

where $$\vec{\nabla} = \left(\frac{\partial}{\partial x}, \frac{\partial}{\partial y}, \frac{\partial}{\partial z}\right)$$

is the gradient operator;

$\rho^j(\vec{x})$ is a density in the j-th density model $\rho_j$ at an observation point $\vec{x}$ in the synthetic medium;

$v^j(\vec{x})$ is a wave speed in the j-th velocity model $V_j$ at the observation point);

$p_j^{syn}(\vec{x},t)$ is a synthetic seismic data at the observation point $\vec{x}$ and a time t in the synthetic medium and is a solution to Equation (2); and $S_j(\vec{x},t)$ is a source wavefield at the observation point $\vec{x}$ and time t in the synthetic medium.

An acoustic wave propagates through a medium by compressing and decompressing the medium such that a small volume of the material oscillates in the direction the acoustic wave is traveling. The synthetic seismic data $p_j^{syn}(\vec{x},t)$ may be the pressure wavefield created by the traveling acoustic wave at the observation point $\vec{x}$ in the medium and time t and is uniquely determined by the wave equation in Equation (2). The source wavefield $S_j(\vec{x},t)$ is the far-field source wavefield generated by the source and may be computed from near-field pressure measurements recorded using hydrophones located near each source element of the source at the time the source is activated or may be a synthetic far-field source wavefield. The density $\rho^j(\vec{x})$ is the mass of the medium per unit volume of the medium at the observation point $\vec{x}$ and is given by the j-th density model $\rho_j$. The wave speed $v^j(\vec{x})$ is the wave speed at the observation point $\vec{x}$ and is given by the j-th velocity model $V_j$. The quantity in the denominator of the first term of Equation (2) is the bulk modulus given by $$\kappa^j(\vec{x}) = \rho^j(\vec{x})v^j(\vec{x})^2 \qquad (3)$$

The bulk modulus $\kappa^j(\vec{x})$ characterizes the compressibility of the synthetic medium at the observation point $\vec{x}$ and is defined as a ratio of the pressure change to volume change of the synthetic medium multiplied by the volume of the synthetic medium at the observation point $\vec{x}$. The more compressible the synthetic medium, the smaller the bulk modulus. The more rigid or less compressible the synthetic medium, the larger the bulk modulus.

In block 603, the synthetic seismic data $p_j^{syn}(\vec{x}^r,t)$ is computed at receiver coordinates $\vec{x}^r$ in the medium by numerical methods applied to Equation (2) using finite differences or pseudo-spectral methods. Computation of the synthetic seismic data at receiver coordinates in the subterranean formation using forward modeling is represented by:

$$p_j^{syn}(\vec{x}_n^r,t) = F(V_j, \rho_j, S(\vec{x},t)) \qquad (4)$$

where F is a non-linear forward modeling operator.
The source 104 may be regarded as a point source in space, and assuming the source is isotropic, the source wavefield may be represented as follows:

$$S(\vec{x}^r,t) = \delta(\vec{x}^r - \vec{x}^s)S(t) \qquad (5)$$

where S(t) is a source-time function.
Computation of the synthetic pressure wavefield at an observation point in the subterranean formation is given by:

$$p_j^{syn}(\vec{x}^n,t) = F(V_j, \rho_j, S(t)) \qquad (6)$$

In block 604, a residual is computed for each receiver coordinate and time sample as follows:

$$r_j(\vec{x}_n^r,t_k) = p_j^{syn}(\vec{x}_n^r,t_k) - d(\vec{x}_n^r,t_k) \qquad (7)$$

where
n=1, .... N; and
k=1, ..., M
The residual $r_j(\vec{x}_n^r,t)$ is a difference between the trace of synthetic seismic data $p_j^{syn}(\vec{x}_n^r,t)$ and the trace of recorded seismic data $d(\vec{x}_n^r,t)$ for each of the N receivers. In block 605, a residual magnitude is computed for the j-th iteration as follows:

$$\phi_j = \sum_{s=1}^{S}\sum_{n=1}^{N}\sum_{k=1}^{M} \|r_j(\vec{x}_n^r, t_k)\|^2 \qquad (8)$$

where
S is the number of source activations; and
$\|\ \|^2$ is an L2 norm.
When the residual magnitude satisfies the following condition $$\phi_j < \varepsilon \qquad (9)$$

where $\varepsilon$ is a residual magnitude threshold, iterative FWI as represented in FIG. 6 is finished. The iterative FWI represented by steps 603-608 stops.

After low-wavenumber components of the velocity model $V_j$ have been updated and iterative FWI stops, conventional FWI techniques may be applied to the resultant velocity model $V_j$ to introduce high-wavenumber components and obtain a final velocity model $V_f$ 609 with increased resolution. The final velocity model $V_f$ may be used to generate images of the subterranean formation. The final velocity model $V_f$ may also be used to identify the compositions of the various features and layers within the subterranean formation. For example, the final velocity model $V_f$ may be used to identify deposits of natural gas, water, and identify the different types of rock, porous materials, and sediments in the layers of the subterranean formation. The final velocity model may also be used to determine the pressure within a petroleum deposit, which enables petroleum engineers to reduce the risks and hazards of drilling into a high-pressure petroleum deposit. On the other hand, when the condition given by Equation (9) is not satisfied, control flows to blocks 606-608 to update the velocity and density models.

In block 606, adjoint migration is performed using Equation (2) in reverse time, in which the source term is given by the superposition of the residual wavefield computed at each receiver location as described in Equation (9):

$$\left[\frac{1}{\rho^j(\vec{x})v^j(\vec{x})^2}\frac{\partial^2}{\partial t^2} - \vec{\nabla}\cdot\left(\frac{1}{\rho^j(\vec{x})}\vec{\nabla}\right)\right]R_j(\vec{x}, T-t) = \sum_{n=1}^{N} r_j(\vec{x}_n^r, T-t) \qquad (10)$$

where
$R_j(\vec{x},T-t)$ is a time-reversed migrated residual; and
T is the maximum recording time for the seismic data.
In block 607 an impedance gradient and a velocity gradient are computed at observation points of the synthetic medium based on the source wavefield and the migrated residual obtained in block 606. The numerical representation of the velocity gradient is computed by $$G_V^j(\vec{x}) \cong \frac{1}{2A(\vec{x})}\left\{\sum_t W_1(\vec{x},t)\frac{\partial S(\vec{x},t)}{\partial t}\frac{\partial R_j(\vec{x},t)}{\partial t}\Delta t - \sum_t W_2(\vec{x},t)v^2(x)\vec{\nabla}S(\vec{x},t)\cdot\vec{\nabla}R_j(\vec{x},t)\Delta t\right\} \qquad (11a)$$

and the numerical representation of the impedance gradient is computed by $$G_Z^j(\vec{x}) \cong \frac{1}{2A(\vec{x})} \left\{ \sum_t^T W_3(\vec{x}, t) \frac{\partial S(\vec{x}, t)}{\partial t} \frac{\partial R_j(\vec{x}, t)}{\partial t} \Delta t + \sum_t^T W_4(\vec{x}, t) v^2(x) \vec{\nabla} S(\vec{x}, t) \cdot \vec{\nabla} R_j(\vec{x}, t) \Delta t \right\} \quad (11b)$$

where
$\Delta t$ is the sampling rate;
$A(\vec{x})$ is an illumination term;
$R_j(\vec{x},t)$ is migrated residual;
$W_3(\vec{x},t)$ and $W_2(\vec{x},t)$ are velocity dynamic weights; and
$W_3(\vec{x},t)$ and $W_4(\vec{x},t)$ are impedance dynamic weights.

The illumination term is $A(\vec{x})=\Sigma_t^T |S(\vec{x},t)|^2 \Delta t$ at each point $\vec{x}$. In Equations (11a) and (11b), the migrated residuals $R_j(\vec{x},t)$ are obtained by time reversing the time-reversed migrated residual $R_j(\vec{x},T-t)$. The first term in Equation (11a) and the first term in Equation (11b) are weighted bulk modulus sensitivity kernels. The second term in Equation (11a) and second term in Equation (11b) are weighted density sensitivity kernels. The velocity dynamic weights of the velocity gradient in Equation (11a) are designed to optimally suppress the high-wavenumber components while preserving the low-wavenumber components of the velocity model. The impedance dynamic weights of the impedance gradient in Equation (11b) are designed to optimally suppress the low-wavenumber components of the density model. The velocity dynamic weights are computed by minimization as follows:

$$W_1(\vec{x}, t) = \min_r \left\{ -rv^2(x) \vec{\nabla} S(\vec{x}, t) \cdot \vec{\nabla} R_j(\vec{x}, t) + (1-r) \frac{\partial S(\vec{x}, t)}{\partial t} \frac{\partial R_j(\vec{x}, t)}{\partial t} \right\}$$

$$W_2(\vec{x}, t) = 1 - W_1(\vec{x}, t)$$

where r is a trial weight and $0 \leq r \leq 1$.
The impedance dynamic weights are computed by minimization as follows:

$$W_3(\vec{x}, t) = \min_r \left\{ rv^2(x) \vec{\nabla} S(\vec{x}, t) \cdot \vec{\nabla} R_j(\vec{x}, t) + (1-r) \frac{\partial S(\vec{x}, t)}{\partial t} \frac{\partial R_j(\vec{x}, t)}{\partial t} \right\}$$

$$W_4(\vec{x}, t) = 1 - W_3(\vec{x}, t)$$

The bulk modulus and density sensitivity kernels relationship to the impedance gradient $G_z^j(\vec{x})$ and the velocity gradient $G_v^j(\vec{x})$ is described below.

In block 608, the velocity at each observation point in the velocity model $V_j$ is updated as follows:

$$v_{j+1}(\vec{x}) = v_j(\vec{x}) + D_v G_v^j(\vec{x}) \quad (12a)$$

where $D_v$ is a constant called "velocity step length."
The updated velocities at the observation points of the synthetic medium form the velocity model $V_{j+1}$. For the density estimation, it is assumed that the velocity is fixed, and at each observation point in the density model $\rho_j$ is updated as follows:

$$\rho_{j+1}(\vec{x}) = \rho_j(\vec{x}) + D_\rho G_Z^j(\vec{x}) \quad (12b)$$

where $D_\rho$ is the corresponding "density step length."

With each iteration, low-wavenumber components are added to the velocity model according to Equation (12a) and high-wavenumber components are added to the density model according to Equations (12b). In addition, with each iteration, Equations (12a) and (12b) change the locations of the interfaces and formation surface, as illustrated in FIG. 8.

Processes and systems are not limited to executing the operations in the order represented by blocks 603-608. For example, in another implementation of iterative FWI, the computational operation of Equation (8) and condition in Equation (9), as represented in block 605, may be executed after updates to the density model and the velocity model in block 608 and before computation of updated synthetic seismic data in block 603.

Iterative FWI described above solves a nonlinear problem by matching synthetic seismic data to recorded seismic data. The matching is quantified by the residuals of a least-squares misfit function, and the model update is computed as a scaled representation of the model gradient. The gradient depends on the sensitivity kernel of the different parameters involved in the description of the subsurfaces. A kernel for a specific parameter is a metric for the sensitivity of the misfit function to any changes in such parameter, while other parameters remain fixed.

In the case of an isotropic medium, parameterized in terms of bulk modulus and density, the gradients in Equations (11a) and (11b) depend on a bulk modulus sensitivity kernel given by:

$$K_\kappa(\vec{x}) = \frac{1}{\kappa(\vec{x})} \int \frac{\partial S(\vec{x}, t)}{\partial t} \frac{\partial R(\vec{x}, t)}{\partial t} dt \quad (13a)$$

and a density sensitivity kernel given by:

$$K_\rho(\vec{x}) = \frac{1}{\rho(\vec{x})} \int \vec{\nabla} S(\vec{x}, t) \cdot \vec{\nabla} R(\vec{x}, t) dt \quad (13b)$$

The contribution of the bulk modulus sensitivity kernel in Equation (13a) is approximated in Equations (11a) and (11b) by the weighted summation $$K_\kappa(\vec{x}) \propto \sum_t^T W_\alpha(\vec{x}, t) \frac{\partial S(\vec{x}, t)}{\partial t} \frac{\partial R_j(\vec{x}, t)}{\partial t} \Delta t$$

where $\alpha=1, 3$.
The contribution of the density sensitivity kernel in Equation (13b) is approximated in Equations (11a) and (11b) by the weighted summation $$K_\rho(\vec{x}) \propto \sum_t^T W_\beta(\vec{x}, t) v^2(x) \vec{\nabla} S(\vec{x}, t) \cdot \vec{\nabla} R_j(\vec{x}, t) \Delta t$$

where $\beta=2, 4$.
A velocity sensitivity kernel may be obtained by subtracting the density sensitivity kernel from the bulk modulus sensitivity kernel as follows:

$$K_v(\vec{x}) = K_\kappa(\vec{x}) - K_\rho(\vec{x}) \quad (14a)$$

An impedance sensitivity kernel may be obtained by combining the bulk modulus sensitivity kernel and density sensitivity kernel as follows:

$$K_z(\vec{x}) = K_\kappa(\vec{x}) + K_\rho(\vec{x}) \tag{14b}$$

The density and velocity models of Equations (12a) and (12b) are iteratively computed in a cascade manner. The input velocity model $V_0$ and input density model $\rho_0$ are generally smooth and do not exhibit sharp contrast at interfaces, with exceptions for the water bottom, and in the case of the velocity model, interfaces of salt or carbonate layers. The impedance sensitivity kernel $K_z(\vec{x})$ is used to compute small-scale density perturbations for such reflections. It is assumed that density perturbations are responsible for changes in physical properties that produce the reflection observed in the field data while the velocity is fixed. Density perturbations are used to compute reflection events in the synthetic or modeled traces. The reflections may be compared to those observed in the recorded traces. Once the density perturbations are introduced into the input density model $\rho_0$ and the reflections simulated from Equation (2), the velocity sensitivity kernel $K_v(\vec{x})$ is applied to obtain the low-wavenumber velocity model updates from such reflections. Estimation of the density model is repeated using the updated velocity model, correcting the locations of the density perturbations over those provided by the initial density model. The modeled traces are re-computed and the velocity sensitivity kernel $K_v(\vec{x})$ is used to update large-scale features of the velocity model. The iterative FWI illustrated in FIG. 6 is repeated until the condition described in Equation (9) is satisfied. Once the low-wavenumber components have been added to the velocity model by iterative FWI described above, high-wavenumber components may be added to the velocity model by conventional FWI to obtain a final velocity model. The final velocity model obtained by iterative FWI followed by conventional FWI may be used to generate an image of the subterranean formation and determine the composition of the subterranean formation.

In an alternative implementation, rather than using the condition given in Equations (8) and (9), the number of iterations may be fixed (e.g., ten, twenty, or fifty iterations). When the number of iterations matches the fixed number of iterations, the most recently updated velocity model generated in block 608 is returned.

The impedance sensitivity kernel of Equation (14b) contains the high-wavenumber components of the velocity model while the velocity sensitivity kernel of Equation (14a) contains the low-wavenumber components of the velocity model. The impedance sensitivity kernel is useful for reverse-time migration, where a high-resolution model is desirable and the velocity model is fixed. On the other hand, the velocity sensitivity kernel is useful for FWI, where low-wavenumber components of the gradient are preferred while the high-wavenumber components are associated with reflections. Whitmore, N. D. and S. Crawley, 2012, "Application of RTM inverse scattering imaging conditions," 82$^{nd}$ Annual International Meeting, *SEG Expanded Abstracts* discuss using the impedance sensitivity kernel to derive an imaging condition capable of removing unwanted backscattered noise. On the other hand, Ramos-Martinez et al., 2016, "A robust FWI gradient for high-resolution velocity model building," 86$^{th}$ Annual International Meeting, *SEG Expanded Abstracts*, pp. 1258-1262 discuss using the velocity sensitivity kernel for FWI. However, use of the velocity sensitivity kernel in Ramos-Martinez isolates low-wavenumber components of the velocity model based on the assumption that reflectors exist at correct positions.

Processes and system described above overcome the assumptions of Ramos-Martinez et al. (2016) by iteratively computing the impedance and the velocity gradients within the FWI workflow illustrated in FIG. 6. By computing the impedance gradient at each iteration, the reflector positions within the synthetic seismic data can be moved and a coherent density assumption is removed.

Figure 10A:
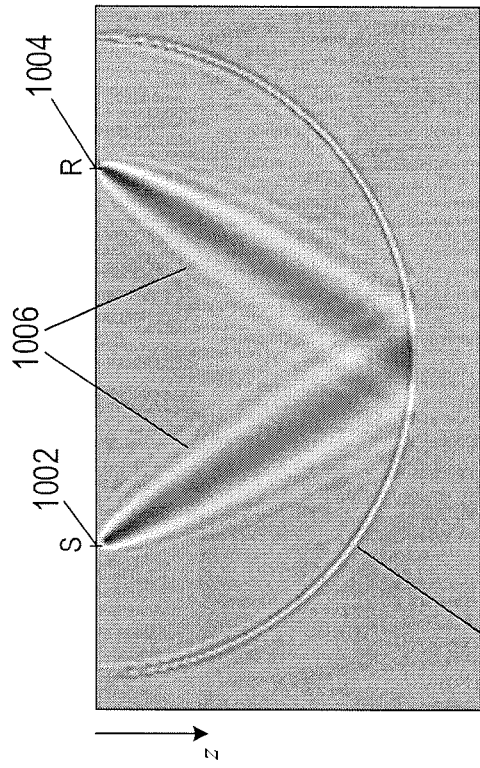
FIGS. 10A-10D shows example full-waveform inversion gradients computed from a bulk modulus sensitivity kernel, density sensitivity kernel, impedance sensitivity kernel, and velocity sensitivity kernel, respectively.
Figure 10B:
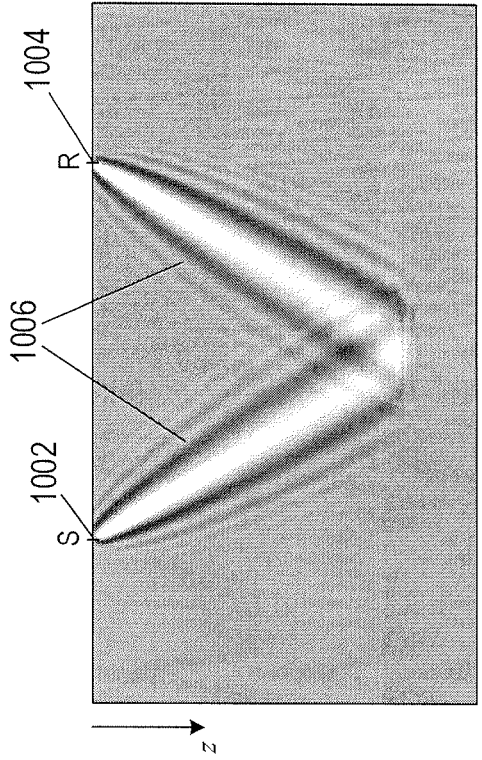

FIG. 10A shows a plot of an FWI gradient computed from a bulk modulus sensitivity kernel. In FIG. 10A, the gradient is produced for a model consisting of a single homogeneous layer overlying a half-space. FIG. 10B shows a plot of an FWI gradient computed using a density sensitivity kernel for the same model as shown in FIG. 10A. The locations of a source 1002 and a receiver 1004 are shown in FIGS. 10A and 10B. The FWI gradients include low-wavenumber components (i.e., large-scale) 1006 and high-wavenumber components (i.e., small-scale) 1008 that are related to the wavelength $\lambda$ of the acoustic wave (i.e., $k \propto 1/\lambda$). The low-wavenumber components 1006 are the result of cross-correlation of the down-going wavefields and the backscattering produced by a sharp interface. Low-wavenumber components correspond to low-wavenumber features of the velocity model. The high-wavenumber components 1008 may be referred to as a migration isochrone and correspond to specular reflections. High-wavenumber components correspond to high-wavenumber features of the velocity model and may be produced by reflected acoustic energy.

Figure 10C:
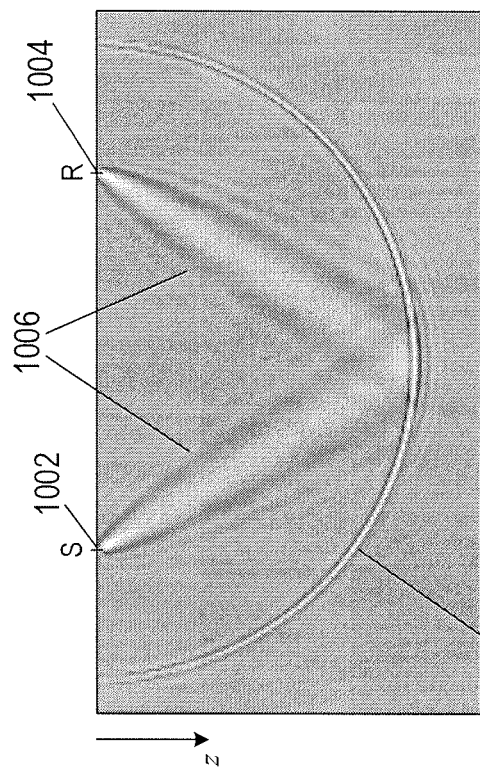

FIG. 10C shows a plot of an impedance gradient produced with a dynamically weighted impedance sensitivity kernel for the same model as FIGS. 10A and 10B. The impedance sensitivity kernel corresponds to Equation (14b) and the impedance gradient is computed according to Equation (11b). The locations of the source 1002 and the receiver 1004 are shown. The image illustrates that high-wavenumber components present in FIGS. 10A-10B are preserved. The image also illustrates that the low-wavenumber components 1006 is FIGS. 10A-10B are suppressed.

Figure 10D:
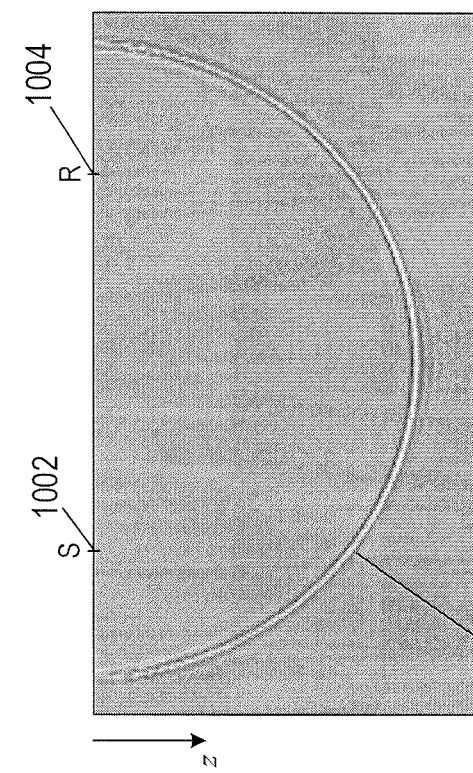

FIG. 10D shows a plot of a velocity gradient produced with a dynamically weighted velocity sensitivity kernel for the same model as FIGS. 10A and 10B. The velocity sensitivity kernel corresponds to Equation (14a) and the velocity gradient is computed according to Equation (11a). The locations of the source 1002 and the receiver 1004 are shown. The image illustrates that high-wavenumber components present in FIGS. 10A-10B are suppressed because the migration isochrone 1008 is no longer present. The image also illustrates that the low-wavenumber components 1006 are preserved and/or enhanced.

Figure 11:
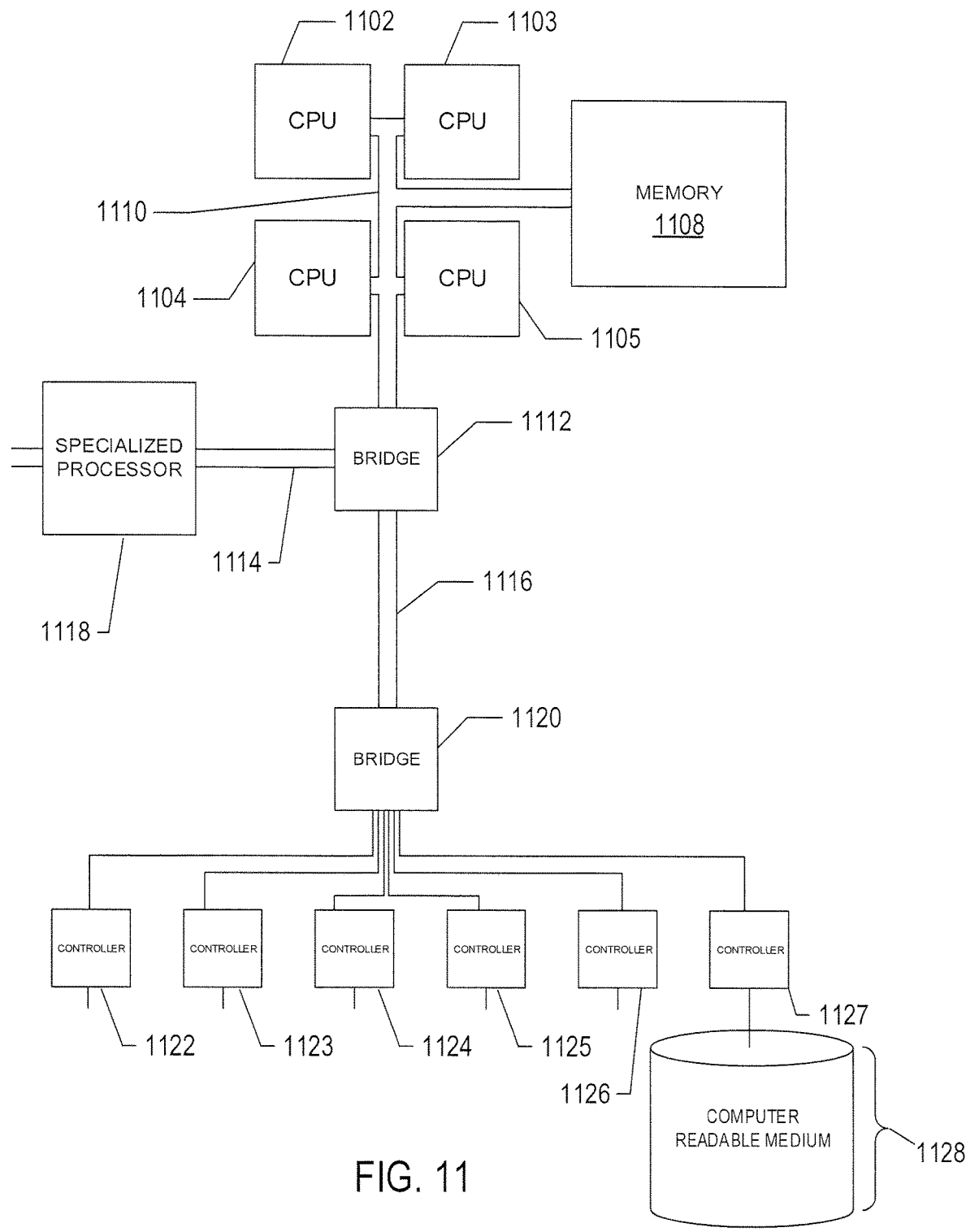
FIG. 11 shows an example of a computer system that executes an efficient process for generating a velocity model of a subterranean formation.

FIG. 11 shows an example of a computer system that executes an efficient process for generating a velocity model and therefore represents a geophysical-analysis system. The internal components of many small, mid-sized, and large computer systems as well as specialized processor-based storage systems can be described with respect to this generalized architecture, although each system may feature many additional components, subsystems, and similar, parallel systems with architectures similar to this generalized architecture. The computer system contains one or multiple central processing units ("CPUs") 1102-1105, one or more electronic memories 1108 interconnected with the CPUs by a CPU/memory-subsystem bus 1110 or multiple busses, a first bridge 1112 that interconnects the CPU/memory-subsystem bus 1110 with additional busses 1114 and 1116, or other types of high-speed interconnection media, including multiple, high-speed serial interconnects. The busses or serial interconnections, in turn, connect the CPUs and memory with specialized processors, such as a graphics processor 1118, and with one or more additional bridges 1120, which are interconnected with high-speed serial links or with multiple controllers 1122-1127, such as controller 1127, that provide access to various different types of computer-readable media, such as computer-readable medium 1128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1128 is a data-storage device and may include, for example, electronic memory, optical or magnetic disk drive, USB drive, magnetic tape, flash memory and other such data-storage devices. The computer-readable medium 1128 can be used to store machine-readable instructions that encode the computational processes described above and can be used to store encoded data, during store operations, and from which encoded data can be retrieved, during read operations, by computer systems, data-storage systems, and peripheral devices.

The processes and systems disclosed herein may be used to form a geophysical data product indicative of certain properties of a subterranean formation. The geophysical data product may be manufactured by using the processes and systems described herein to generate geophysical data and storing the geophysical data in the computer readable medium 1128. The geophysical data product may include geophysical data such as pressure data, particle motion data, particle velocity data, particle acceleration data, upgoing and downgoing pressure wavefield data, velocity model, density model, and any image of a subterranean formation computed from using the processes and systems described herein. The geophysical data product may be produced offshore (i.e., by equipment on the survey vessel 102) or onshore (i.e., at a computing facility on land), or both.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a computer-implemented process that generates a velocity model of a subterranean formation located beneath a body of water using recorded seismic data that was recorded during a marine survey, the improvement comprising:
   iteratively
      applying forward modeling to a source wavefield and velocity and density models of the subterranean formation to generate updated synthetic seismic data,
      computing a residual between the synthetic seismic data and the recorded seismic data,
      applying adjoint migration to the residual to obtain a migrated residual,
      computing an impedance gradient that suppresses low-wavenumber components of the density model based on the source wavefield and the migrated residual,
      computing a velocity gradient that suppresses high-wavenumber components of the velocity model based on the source wavefield and the migrated residual,
      updating the density model based on the impedance gradient,
      updating the velocity model based on the velocity gradient, and
      computing a residual magnitude of the residual until the residual magnitude is less than a residual magnitude threshold; and
   applying full-waveform inversion to the velocity model to generate a final velocity model containing low-wavenumber and high-wavenumber components, thereby generating a final velocity model of the subterranean formation with improved resolution.

2. The process of claim 1 further comprises using the final velocity model to generate an image of the subterranean formation, the image providing a visual representation of subsurface features and layers within the subterranean formation.

3. The process of claim 1, wherein computing the impedance gradient comprises:
   computing a weighted bulk modulus sensitivity kernel based on a product of a time derivative of the source wavefield and a time derivative of the migrated residual;
   computing a weighted density sensitivity kernel based on a scalar product of a gradient of the source wavefield and a gradient of the migration residual; and
   subtracting the weighted density sensitivity kernel from the weighted bulk modulus sensitivity kernel to obtain the impedance gradient.

4. The process of claim 1, wherein the computing the velocity gradient comprises:
   computing a weighted bulk modulus sensitivity kernel based on a product of a time derivative of the source wavefield and a time derivative of the migrated residual;
   computing a weighted density sensitivity kernel based on a scalar product of a gradient of the source wavefield and a gradient of the migration residual; and
   adding the weighted bulk modulus sensitivity kernel and the weighted density sensitivity kernel to obtain the velocity gradient.

5. The process of claim 1, wherein updating the density model comprises: for each point in the density model, linearly combining an impedance gradient value of the impedance gradient with a previous density to obtain an updated density.

6. The process of claim 1, wherein updating the velocity model comprises: for each point in the velocity model, linearly combining a velocity gradient value of the velocity gradient with a previous wave speed obtain an updated wave speed.

7. A computer system for generating a velocity model of a subterranean formation from recorded seismic data recorded in a marine seismic survey of the subterranean formation, the system comprising:
   one or more processors;
   one or more data-storage devices; and machine-readable instructions stored in the one or more data-storage devices that when executed using the one or more processors controls the system to execute operations comprising:
applying forward modeling to a source wavefield and initial velocity and density models of the subterranean formation to generate synthetic seismic data;
computing a residual between the updated synthetic seismic data and the recorded seismic data;
iteratively
applying adjoint migration to the residual to obtain a migrated residual,
computing an impedance gradient that suppresses low-wavenumber components of the density model based on the source wavefield and the migrated residual,
computing a velocity gradient that suppresses high-wavenumber components of the velocity model based on the source wavefield and the migrated residual,
updating the density model based on the impedance gradient,
updating the velocity model based on the velocity gradient,
applying forward modeling to the source wavefield and the velocity and density models to generate updated synthetic seismic data,
computing a residual between the updated synthetic seismic data and the recorded seismic data, and
computing a residual magnitude of the residual until the residual magnitude is less than a residual magnitude threshold; and
applying full-waveform inversion to the velocity model to generate a final velocity model containing low-wavenumber and high-wavenumber components.

8. The system of claim 7 further comprises using the final velocity model to generate an image of the subterranean formation, the image providing a visual representation of subsurface features and layers within the subterranean formation.

9. The system of claim 7, wherein computing the impedance gradient comprises:
computing a weighted bulk modulus sensitivity kernel based on a product of a time derivative of the source wavefield and a time derivative of the migrated residual;
computing a weighted density sensitivity kernel based on a scalar product of a gradient of the source wavefield and a gradient of the migration residual; and
subtracting the weighted density sensitivity kernel from the weighted bulk modulus sensitivity kernel to obtain the impedance gradient.

10. The system of claim 7, wherein the computing the velocity gradient comprises;
computing a weighted bulk modulus sensitivity kernel based on a product of a time derivative of the source wavefield and a time derivative of the migrated residual;
computing a weighted density sensitivity kernel based on a scalar product of a gradient of the source wavefield and a gradient of the migration residual; and
adding the weighted bulk modulus sensitivity kernel and the weighted density sensitivity kernel to obtain the velocity gradient.

11. The system of claim 7, wherein updating the density model comprises: for each point in the density model, linearly combining an impedance gradient value of the impedance gradient with a previous density to obtain an updated density.

12. The system of claim 7, wherein updating the velocity model comprises: for each point in the velocity model, linearly combining a velocity gradient value of the velocity gradient with a previous wave speed obtain an updated wave speed.

13. A non-transitory computer-readable medium encoded with machine-readable instructions that cause one or more processors of a computer system to execute operations comprising:
iteratively
applying forward modeling to a source wavefield and velocity and density models of the subterranean formation to generate updated synthetic seismic data,
computing a residual between the synthetic seismic data and the recorded seismic data,
applying adjoint migration to the residual to obtain a migrated residual,
computing an impedance gradient that suppresses low-wavenumber components of the density model based on the source wavefield and the migrated residual,
computing a velocity gradient that suppresses high-wavenumber components of the velocity model based on the source wavefield and the migrated residual,
updating the density model based on the impedance gradient,
updating the velocity model based on the velocity gradient, and
computing a residual magnitude of the residual until the residual magnitude is less than a residual magnitude threshold; and
applying full-waveform inversion to the velocity model to generate a final velocity model containing low-wavenumber and high-wavenumber components.

14. The medium of claim 13 further comprises using the final velocity model to generate an image of the subterranean formation, the image providing a visual representation of subsurface features and layers within the subterranean formation.

15. The medium of claim 13, wherein computing the impedance gradient comprises:
computing a weighted bulk modulus sensitivity kernel based on a product of a time derivative of the source wavefield and a time derivative of the migrated residual;
computing a weighted density sensitivity kernel based on a scalar product of a gradient of the source wavefield and a gradient of the migration residual; and
subtracting the weighted density sensitivity kernel from the weighted bulk modulus sensitivity kernel to obtain the impedance gradient.

16. The medium of claim 13, wherein the computing the velocity gradient comprises:
computing a weighted bulk modulus sensitivity kernel based on a product of a time derivative of the source wavefield and a time derivative of the migrated residual;
computing a weighted density sensitivity kernel based on a scalar product of a gradient of the source wavefield and a gradient of the migration residual; and
adding the weighted bulk modulus sensitivity kernel and the weighted density sensitivity kernel to obtain the velocity gradient.

17. The medium of claim 13, wherein updating the density model comprises: for each point in the density model, linearly combining an impedance gradient value of the impedance gradient with a previous density to obtain an updated density.

18. The medium of claim 13, wherein updating the velocity model comprises:
for each point in the velocity model, linearly combining a velocity gradient value of the velocity gradient with a previous wave speed obtain an updated wave speed.

19. Apparatus for generating a velocity model of a subterranean formation from recorded seismic data collected in a marine seismic survey of the subterranean formation, the apparatus comprising:
means for applying forward modeling to a source wavefield and initial velocity and density models of the subterranean formation to generate synthetic seismic data;
means for computing a residual between the updated synthetic seismic data and the recorded seismic data;
means for iteratively
applying adjoint migration to the residual to obtain a migrated residual,
computing an impedance gradient that suppresses low-wavenumber components of the density model based on the source wavefield and the migrated residual,
computing a velocity gradient that suppresses high-wavenumber components of the velocity model based on the source wavefield and the migrated residual,
updating the density model based on the impedance gradient,
updating the velocity model based on the velocity gradient,
applying forward modeling to the source wavefield and the velocity and density models to generate updated synthetic seismic data,
computing a residual between the updated synthetic seismic data and the recorded seismic data, and
computing a residual magnitude of the residual until the residual magnitude is less than a residual magnitude threshold; and
applying full-waveform inversion to the velocity model to generate a final velocity model containing low-wavenumber and high-wavenumber components.

20. The apparatus of claim 19 further comprises means for using the final velocity model to generate an image of the subterranean formation, the image providing a visual representation of subsurface features and layers within the subterranean formation.

21. The apparatus of claim 19, wherein the means for iteratively computing the impedance gradient comprises:
computes a weighted bulk modulus sensitivity kernel based on a product of a time derivative of the source wavefield and a time derivative of the migrated residual;
computes a weighted density sensitivity kernel based on a scalar product of a gradient of the source wavefield and a gradient of the migration residual; and
subtracts the weighted density sensitivity kernel from the weighted bulk modulus sensitivity kernel to obtain the impedance gradient.

22. The apparatus of claim 19, wherein the means for iteratively computing the velocity gradient comprises:
computes a weighted bulk modulus sensitivity kernel based on a product of a time derivative of the source wavefield and a time derivative of the migrated residual;
computes a weighted density sensitivity kernel based on a scalar product of a gradient of the source wavefield and a gradient of the migration residual; and
adds the weighted bulk modulus sensitivity kernel and the weighted density sensitivity kernel to obtain the velocity gradient.

23. The apparatus of claim 19, wherein the means for iteratively updating the density model comprises: for each point in the density model, linearly combines an impedance gradient value of the impedance gradient with a previous density to obtain an updated density.

24. The apparatus of claim 19, wherein the means for iteratively updating the velocity model comprises: for each point in the velocity model, linearly combines a velocity gradient value of the velocity gradient with a previous wave speed obtain an updated wave speed.

25. A method of manufacturing a geophysical data product, the method comprising:
iteratively
applying forward modeling to a source wavefield and velocity and density models of the subterranean formation to generate updated synthetic seismic data,
computing a residual between the synthetic seismic data and the recorded seismic data,
applying adjoint migration to the residual to obtain a migrated residual,
computing an impedance gradient that suppresses low-wavenumber components of the density model based on the source wavefield and the migrated residual,
computing a velocity gradient that suppresses high-wavenumber components of the velocity model based on the source wavefield and the migrated residual,
updating the density model based on the impedance gradient,
updating the velocity model based on the velocity gradient, and
computing a residual magnitude of the residual until the residual magnitude is less than a residual magnitude threshold; and
applying full-waveform inversion to the velocity model to generate a final velocity model containing low-wavenumber and high-wavenumber components.

* * * * *